(12) United States Patent
Sun et al.

(10) Patent No.: US 11,013,003 B2
(45) Date of Patent: May 18, 2021

(54) CONFIGURING A USER EQUIPMENT TO OPERATE IN A TRANSMISSION/RECEPTION POINT (TRP) MODE

(71) Applicant: QUALCOMM Incorporated, San Diego, CA (US)

(72) Inventors: Jing Sun, San Diego, CA (US); Huilin Xu, San Diego, CA (US); Wanshi Chen, San Diego, CA (US); Heechoon Lee, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/526,410

(22) Filed: Jul. 30, 2019

(65) Prior Publication Data

US 2020/0045700 A1 Feb. 6, 2020

Related U.S. Application Data

(60) Provisional application No. 62/714,458, filed on Aug. 3, 2018.

(51) Int. Cl.
| | | |
|---|---|---|
| *H04W 72/04* | (2009.01) | |
| *H04W 88/06* | (2009.01) | |
| *H04W 80/02* | (2009.01) | |
| *H04W 76/27* | (2018.01) | |

(52) U.S. Cl.
CPC ..... *H04W 72/0453* (2013.01); *H04W 72/042* (2013.01); *H04W 76/27* (2018.02); *H04W 80/02* (2013.01); *H04W 88/06* (2013.01)

(58) Field of Classification Search
CPC ..... H04L 5/001; H04L 5/0023; H04L 5/0053; H04L 5/0091; H04L 5/0096; H04W 68/02; H04W 72/042; H04W 72/0453; H04W 76/27; H04W 80/02; H04W 88/06
See application file for complete search history.

(56) References Cited

FOREIGN PATENT DOCUMENTS

WO WO-2019227467 A1 * 12/2019 ............ H04W 68/02

OTHER PUBLICATIONS

International Search Report and Written Opinion—PCT/US2019/044334—ISA/EPO—dated Oct. 19, 2019.

(Continued)

*Primary Examiner* — Khoa Huynh
(74) *Attorney, Agent, or Firm* — Michael J. De Haemer, Jr.

(57) ABSTRACT

Various aspects of the present disclosure generally relate to wireless communication. In some aspects, a base station (BS) may determine to configure a user equipment (UE) to operate in a transmission/reception point (TRP) mode, wherein the TRP mode is a single-TRP mode or a multi-TRP mode. The BS may configure the UE to operate in the TRP mode based at least in part on a bandwidth part (BWP) switch or a trigger to switch between the multi-TRP mode and the single-TRP mode within a BWP. Numerous other aspects are provided.

17 Claims, 12 Drawing Sheets

(56) References Cited

OTHER PUBLICATIONS

Nokia, et al., "Remaining Details on Multi-TRP Transmission", 3GPP TSG RAN WG1 NR Ad Hoc #3, 3GPP Draft; R1-1716494, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), 6 Pages, XP051339947, Retrieved from the Internet: URL: http://www.3gpp.org/ftp/Meetings_3GPP_SYNC/RAN1/Docs/ [retrieved on Sep. 17, 2017] section 2.
Vivo: "Remaining Issues on NR UL Power Control", 3GPP TSG RAN WG1 Meeting #92, 3GPP Draft; R1-1801546_Remaining Issues on NR UL Power Control, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 15, 2018 (Feb. 15, 2018), 5 Pages, XP051396798, Retrieved from the Internet: URL: http://www.3gpp.org/ftp/tsg%5Fran/WG1%5FRL1/TSGR1%5F92/Docs/ [retrieved on Feb. 15, 2018] section 2.1.

\* cited by examiner

CONFIGURING A USER EQUIPMENT TO OPERATE IN A TRANSMISSION/RECEPTION POINT (TRP) MODE

CROSS-REFERENCE TO RELATED APPLICATIONS UNDER 35 U.S.C. § 119

This application claims priority to U.S. Provisional Patent Application No. 62/714,458, filed on Aug. 3, 2018, entitled "CONFIGURING A USER EQUIPMENT TO OPERATE IN A TRANSMISSION/RECEPTION POINT (TRP) MODE," which is hereby expressly incorporated by reference herein.

FIELD OF THE DISCLOSURE

Aspects of the present disclosure generally relate to wireless communication and to techniques and apparatuses for configuring a user equipment to operate in a transmission/reception point (TRP) mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include determining to configure a user equipment (UE) to operate in a transmission/reception point (TRP) mode, wherein the TRP mode is a single-TRP mode or a multi-TRP mode; and configuring the UE to operate in the TRP mode based at least in part on a bandwidth part (BWP) switch or a trigger to switch between the multi-TRP mode and the single-TRP mode within a BWP.

In some aspects, a method of wireless communication, performed by a user equipment (UE), may include receiving configuration information associated with causing the UE to operate in a transmission/reception point (TRP) mode, wherein the TRP mode is a single-TRP mode or a multi-TRP mode; and configuring the UE to operate in the TRP mode based at least in part on receiving the configuration information and at least one of a bandwidth part (BWP) switch or a trigger to switch between the multi-TRP mode and the single-TRP mode within a BWP.

In some aspects, a BS for wireless communication may include memory and one or more processors operatively coupled to the memory. The memory and the one or more processors may be configured to determine to configure a user equipment (UE) to operate in a transmission/reception point (TRP) mode, wherein the TRP mode is a single-TRP mode or a multi-TRP mode; and configure the UE to operate in the TRP mode based at least in part on a bandwidth part (BWP) switch or a trigger to switch between the multi-TRP mode and the single-TRP mode within a BWP.

In some aspects, a UE for wireless communication may include memory and one or more processors operatively coupled to the memory. The memory and the one or more processors may be configured to receive configuration information associated with causing the UE to operate in a transmission/reception point (TRP) mode, wherein the TRP mode is a single-TRP mode or a multi-TRP mode; and configure the UE to operate in the TRP mode based at least in part on receiving the configuration information and at least one of a bandwidth part (BWP) switch or a trigger to switch between the multi-TRP mode and the single-TRP mode within a BWP.

In some aspects, a non-transitory computer-readable medium may store one or more instructions for wireless communication. The one or more instructions, when executed by one or more processors of a base station, may cause the one or more processors to determine to configure a user equipment (UE) to operate in a transmission/reception point (TRP) mode, wherein the TRP mode is a single-TRP mode or a multi-TRP mode; and configure the UE to operate in the TRP mode based at least in part on a bandwidth part (BWP) switch or a trigger to switch between the multi-TRP mode and the single-TRP mode within a BWP.

In some aspects, a non-transitory computer-readable medium may store one or more instructions for wireless communication. The one or more instructions, when executed by one or more processors of a UE, may cause the one or more processors to receive configuration information associated with causing the UE to operate in a transmission/reception point (TRP) mode, wherein the TRP mode is a single-TRP mode or a multi-TRP mode; and configure the UE to operate in the TRP mode based at least in part on receiving the configuration information and at least one of a bandwidth part (BWP) switch or a trigger to switch between the multi-TRP mode and the single-TRP mode within a BWP.

In some aspects, an apparatus for wireless communication may include means for determining to configure a user equipment (UE) to operate in a transmission/reception point (TRP) mode, wherein the TRP mode is a single-TRP mode or a multi-TRP mode; and means for configuring the UE to operate in the TRP mode based at least in part on a bandwidth part (BWP) switch or a trigger to switch between the multi-TRP mode and the single-TRP mode within a BWP.

In some aspects, an apparatus for wireless communication may include means for receiving configuration information associated with causing the apparatus to operate in a transmission/reception point (TRP) mode, wherein the TRP mode is a single-TRP mode or a multi-TRP mode; and configuring the apparatus to operate in the TRP mode based at least in part on receiving the configuration information and at least one of a bandwidth part (BWP) switch or a trigger to switch between the multi-TRP mode and the single-TRP mode within a BWP.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
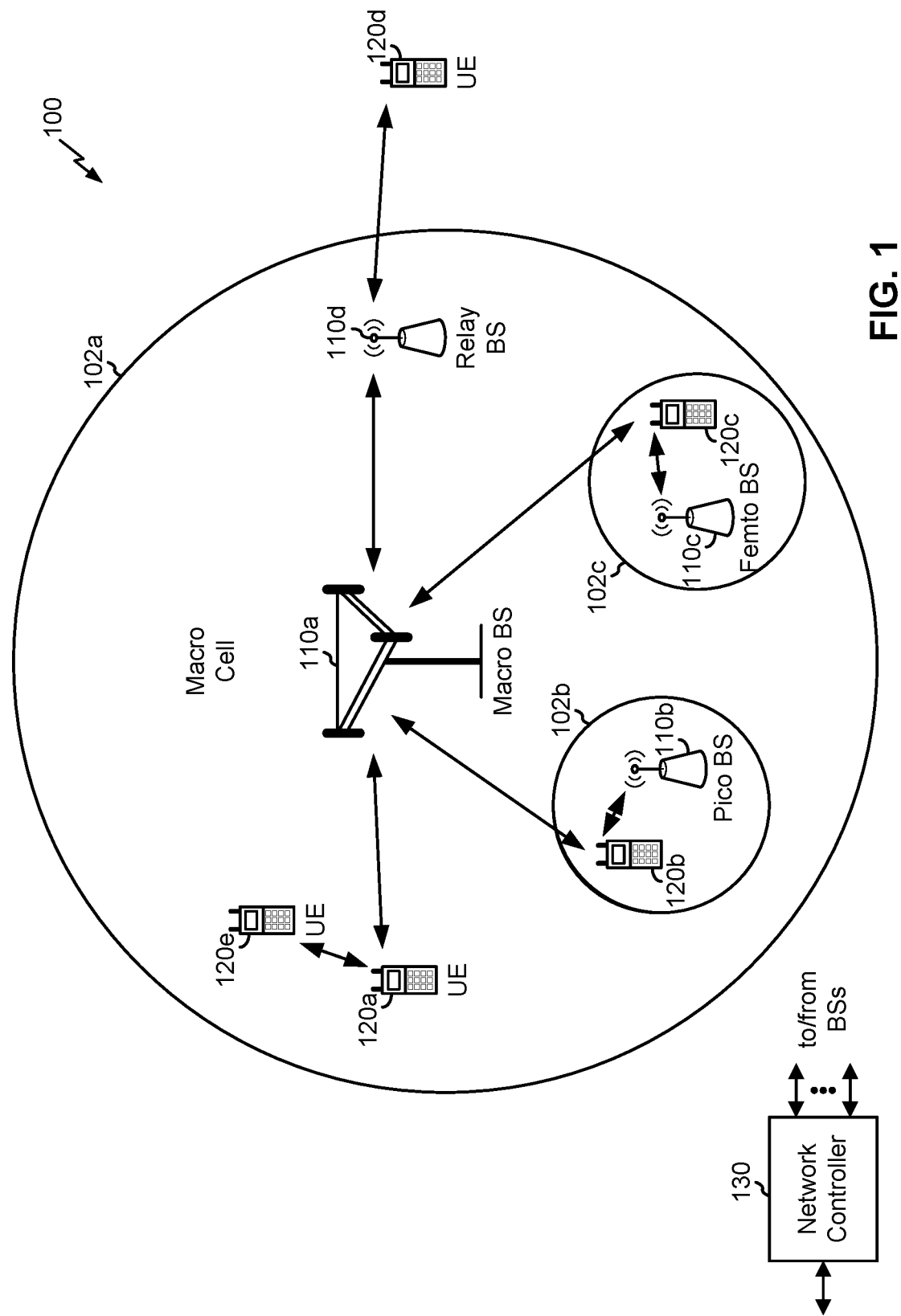
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
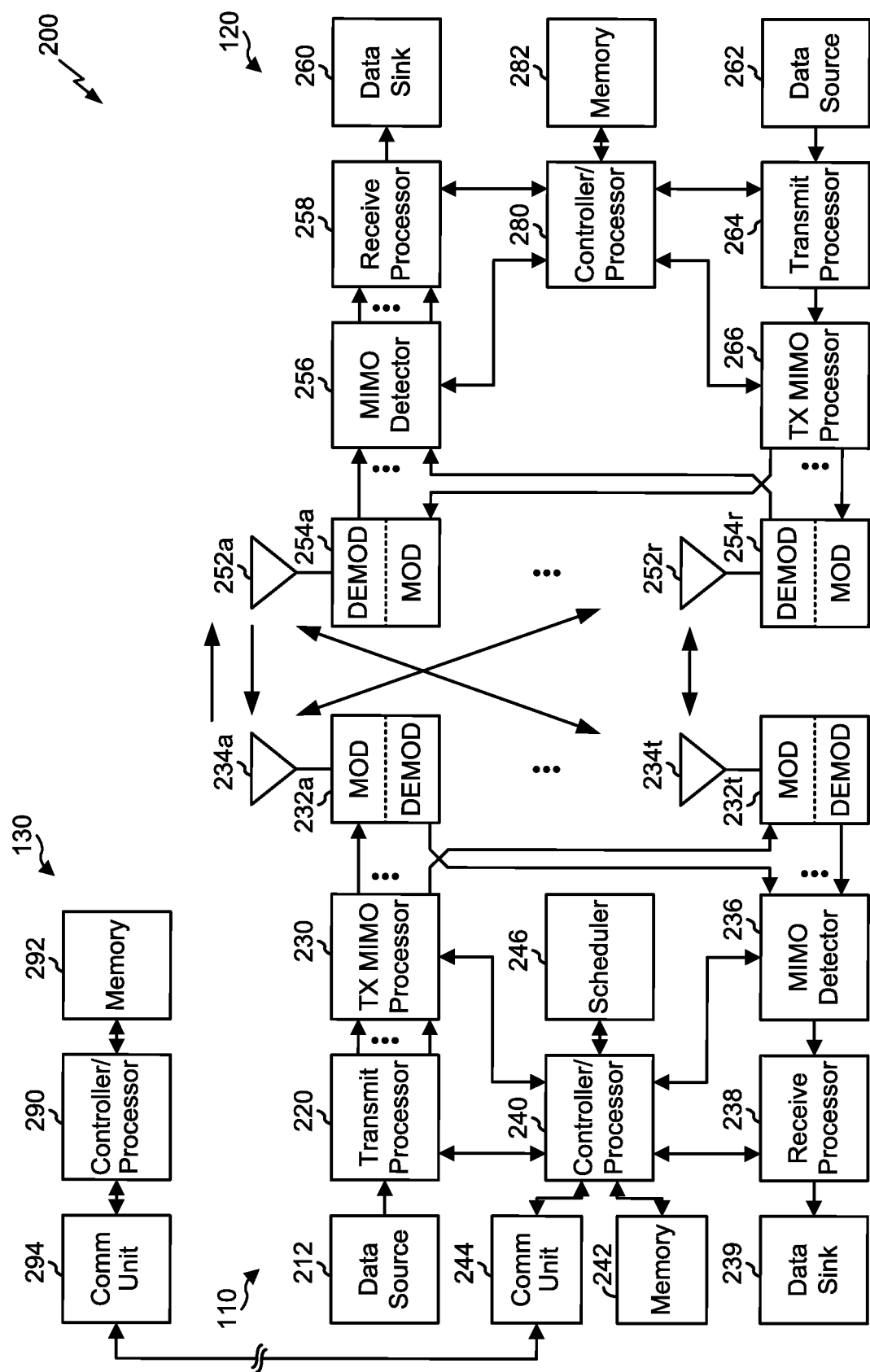
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, wherein general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring UE 120 to operate in a transmission/reception point (TRP) mode, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, BS 110 may include means for determining to configure a UE to operate in a transmission/reception point (TRP) mode, means for configuring the UE to operate in the TRP mode based at least in part on determining to configure the UE to operate in the TRP mode, and/or the like. Additionally, or alternatively, BS 110 may include means for determining to configure a UE to operate in a transmission/reception point (TRP) mode, wherein the TRP mode is a single-TRP mode or a multi-TRP mode; means for configuring the UE to operate in the TRP mode based at least in part on a bandwidth part (BWP) switch or a trigger to switch between the multi-TRP mode and the single-TRP mode within a BWP; and/or the like. In some aspects, such means may include one or more components of UE 120 described in connection with FIG. 2.

In some aspects, UE 120 may include means for receiving configuration information associated with causing the UE to operate in a transmission/reception point (TRP) mode, means for configuring the UE to operate in the TRP mode based at least in part on receiving the configuration information, and/or the like. Additionally, or alternatively, UE 120 may include means for receiving configuration information associated with causing the UE to operate in a transmission/reception point (TRP) mode, wherein the TRP mode is a single-TRP mode or a multi-TRP mode; means for configuring the UE to operate in the TRP mode based at least in part on receiving the configuration information and at least one of a bandwidth part (BWP) switch or a trigger to switch between the multi-TRP mode and the single-TRP mode within a BWP; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
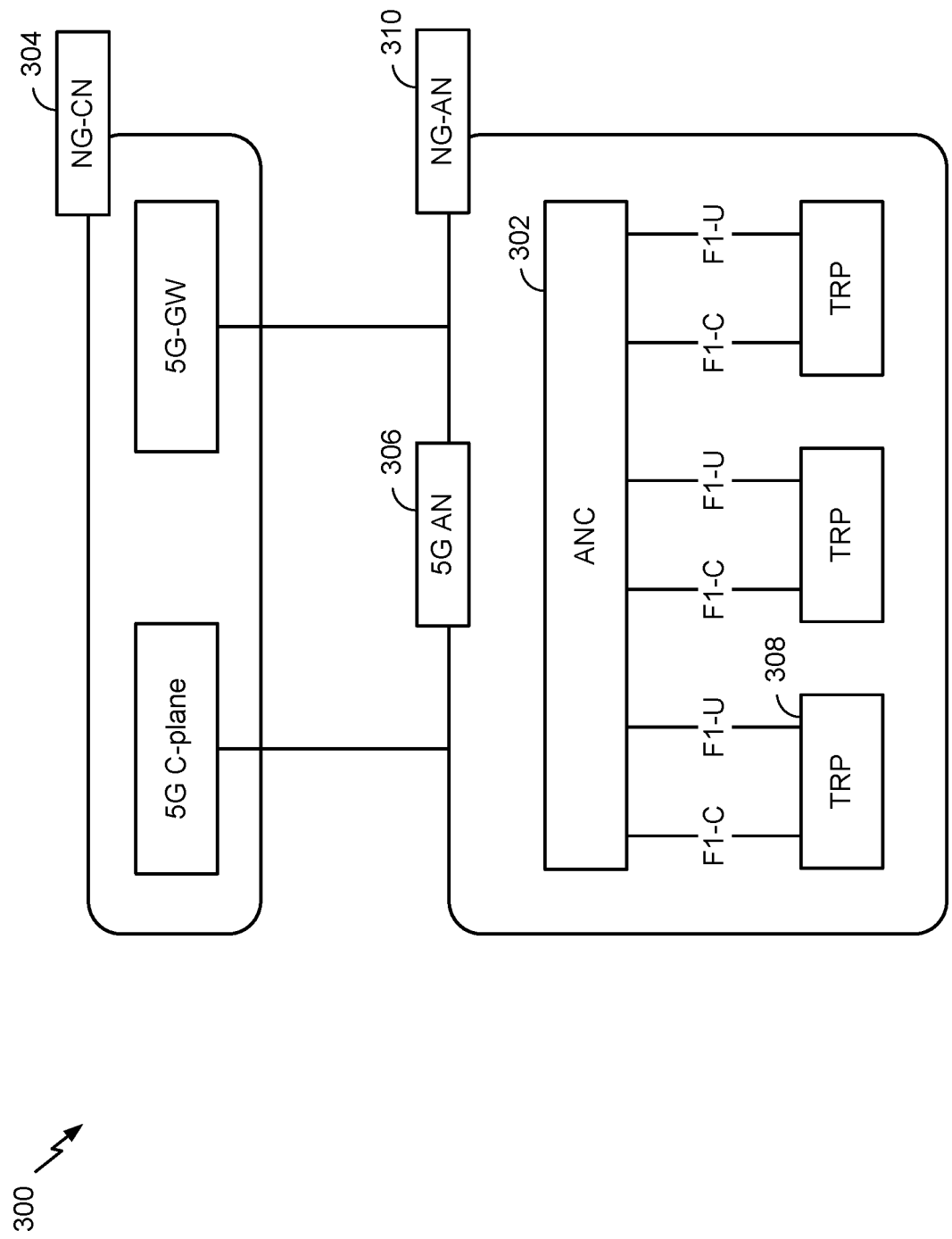
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), medium access control (MAC) protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
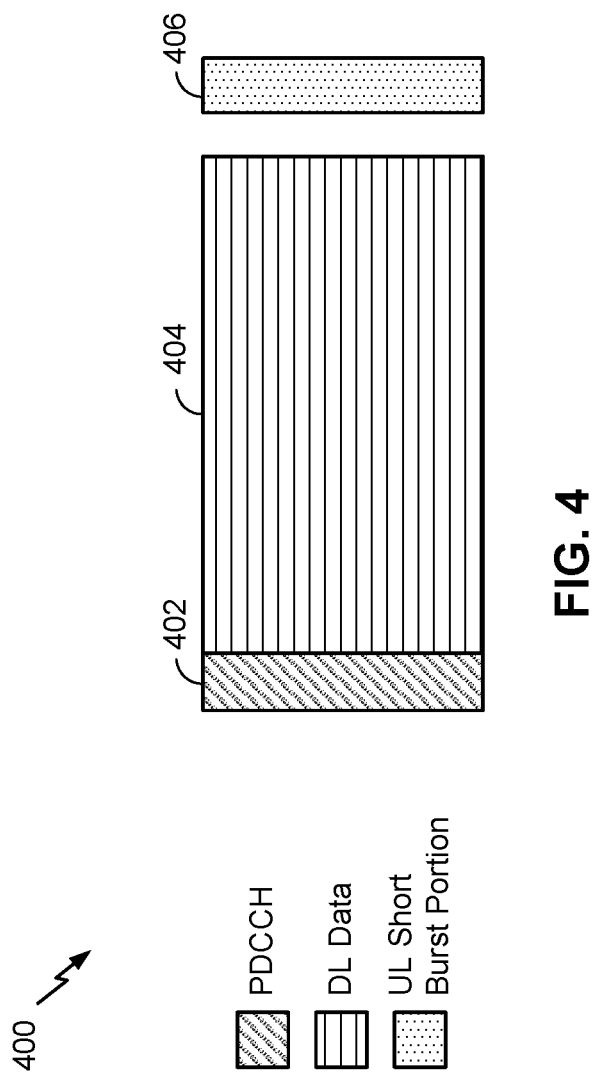
FIG. 4 is a diagram illustrating an example of a downlink (DL)-centric slot, in accordance with various aspects of the present disclosure.

FIG. 4 is a diagram 400 showing an example of a DL-centric slot or wireless communication structure. The DL-centric slot may include a control portion 402. The control portion 402 may exist in the initial or beginning portion of the DL-centric slot. The control portion 402 may include various scheduling information and/or control information corresponding to various portions of the DL-centric slot. In some configurations, the control portion 402 may be a physical DL control channel (PDCCH), as indicated in FIG. 4. In some aspects, the control portion 402 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 404. The DL data portion 404 may sometimes be referred to as the payload of the DL-centric slot. The DL data portion 404 may include the communication resources utilized to communicate DL data from the scheduling entity (e.g., UE or BS) to the subordinate entity (e.g., UE). In some configurations, the DL data portion 404 may be a physical DL shared channel (PDSCH).

The DL-centric slot may also include an UL short burst portion 406. The UL short burst portion 406 may sometimes be referred to as an UL burst, an UL burst portion, a common UL burst, a short burst, an UL short burst, a common UL short burst, a common UL short burst portion, and/or various other suitable terms. In some aspects, the UL short burst portion 406 may include one or more reference signals. Additionally, or alternatively, the UL short burst portion 406 may include feedback information corresponding to various other portions of the DL-centric slot. For example, the UL short burst portion 406 may include feedback information corresponding to the control portion 402 and/or the data portion 404. Non-limiting examples of information that may be included in the UL short burst portion 406 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 406 may include additional or alternative information, such as information pertaining to random access channel (RACH) procedures, scheduling requests, and various other suitable types of information.

As illustrated in FIG. 4, the end of the DL data portion 404 may be separated in time from the beginning of the UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 4 is provided merely as an example. Other examples are possible and may differ from what was described with regard to FIG. 4.

Figure 5:
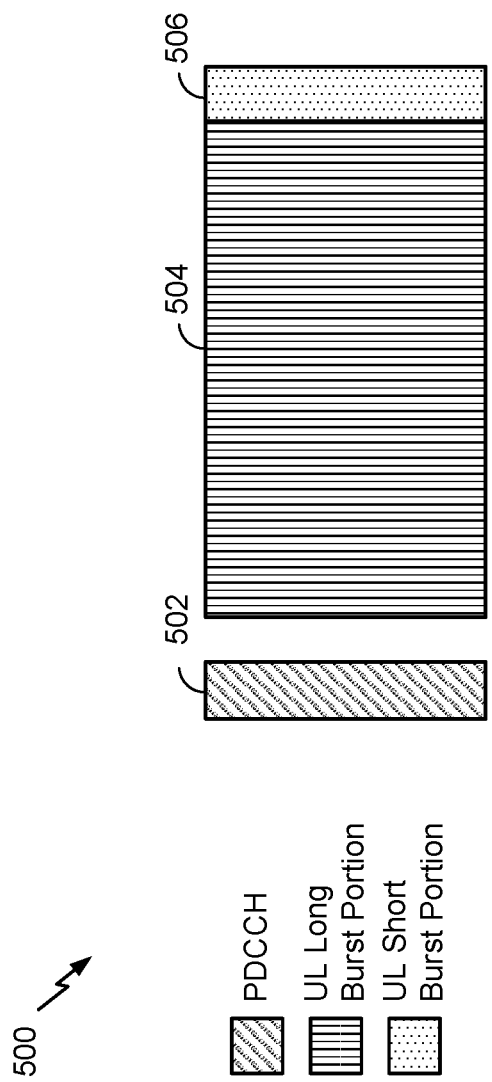
FIG. 5 is a diagram illustrating an example of an uplink (UL)-centric slot, in accordance with various aspects of the present disclosure.

FIG. 5 is a diagram 500 showing an example of an UL-centric slot or wireless communication structure. The UL-centric slot may include a control portion 502. The control portion 502 may exist in the initial or beginning portion of the UL-centric slot. The control portion 502 in FIG. 5 may be similar to the control portion 402 described above with reference to FIG. 4. The UL-centric slot may also include an UL long burst portion 504. The UL long burst portion 504 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 502 may be a physical DL control channel (PDCCH).

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. The UL short burst portion 506 in FIG. 5 may be similar to the UL short burst portion 406 described above with reference to FIG. 4, and may include any of the information described above in connection with FIG. 4. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 5 is provided merely as an example. Other examples are possible and may differ from what was described with regard to FIG. 5.

Currently in NR, a UE may be configured with up to four bandwidth parts (BWPs) with one active BWP at a time. Switching of a BWP can be triggered dynamically by downlink control information (DCI) in a PDCCH grant. PDCCH and PDSCH may be configured by a BS on a per BWP basis. For example, PDCCH configurations and/or PDSCH configurations may include transmission configuration indication (TCI) states and remaining configurations independent of TCI states.

With regard to TRPs associated with the BWPs configured for the UE, the maximum number of supported PDCCHs associated with scheduled PDSCHs that a UE can be expected to receive in a single slot is two on a per-component carrier (CC) basis (e.g., in the case of one BWP for the CC). For example, a single PDCCH may schedule a single PDSCH where separate layers are transmitted from separate TRPs (e.g., a single PDCCH and single PDSCH mode). Alternatively, and as another example, multiple PDCCHs may schedule a respective PDSCH transmitted from a separate TRP (e.g., a dual PDCCH and dual PDSCH mode). While a UE may be configured with the single PDCCH and single PDSCH mode or the dual PDCCH and dual PDSCH mode, a BS may lack a technique for dynamically configuring a UE to switch between the single PDCCH and single PDSCH mode and the dual PDCCH and dual PDSCH mode.

Some aspects described herein provide a BS that is capable of dynamically configuring a UE to operate in a single TRP mode (e.g., a single PDCCH and single PDSCH mode) or a multi-TRP mode (e.g., a multiple PDCCH mode and multiple PDSCH mode). For example, the BS may configure, on a per-BWP basis, a TRP mode for the UE based at least in part on a higher layer radio resource control (RRC) configuration, a medium access control (MAC) layer configuration, a PDCCH configuration, and/or the like. In this way, the BS may facilitate switching by a UE between a single TRP mode and a multi-TRP mode. This improves operations of the UE by dynamically modifying operations of the UE. In addition, this provides a technique that can be used for TRP modes that include two or more PDCCHs and/or PDSCHs (e.g., a higher quantity of TRPs than the current maximum quantity). Further, this provides an efficient way to facilitate switching via use of RRC-related configurations, MAC-related configurations, PDCCH-related configurations, and/or the like that the UE currently implements. Further, this facilitates switching between TRP modes on an as-needed basis, thereby improving operations of the UE. Further, this facilitates configuration of TRP modes for power saving, improved reliability, and/or the like (e.g., some BWPs may be configured in single TRP mode as a fallback for power saving), thereby improving operations and/or communications associated with a UE.

Figure 6:
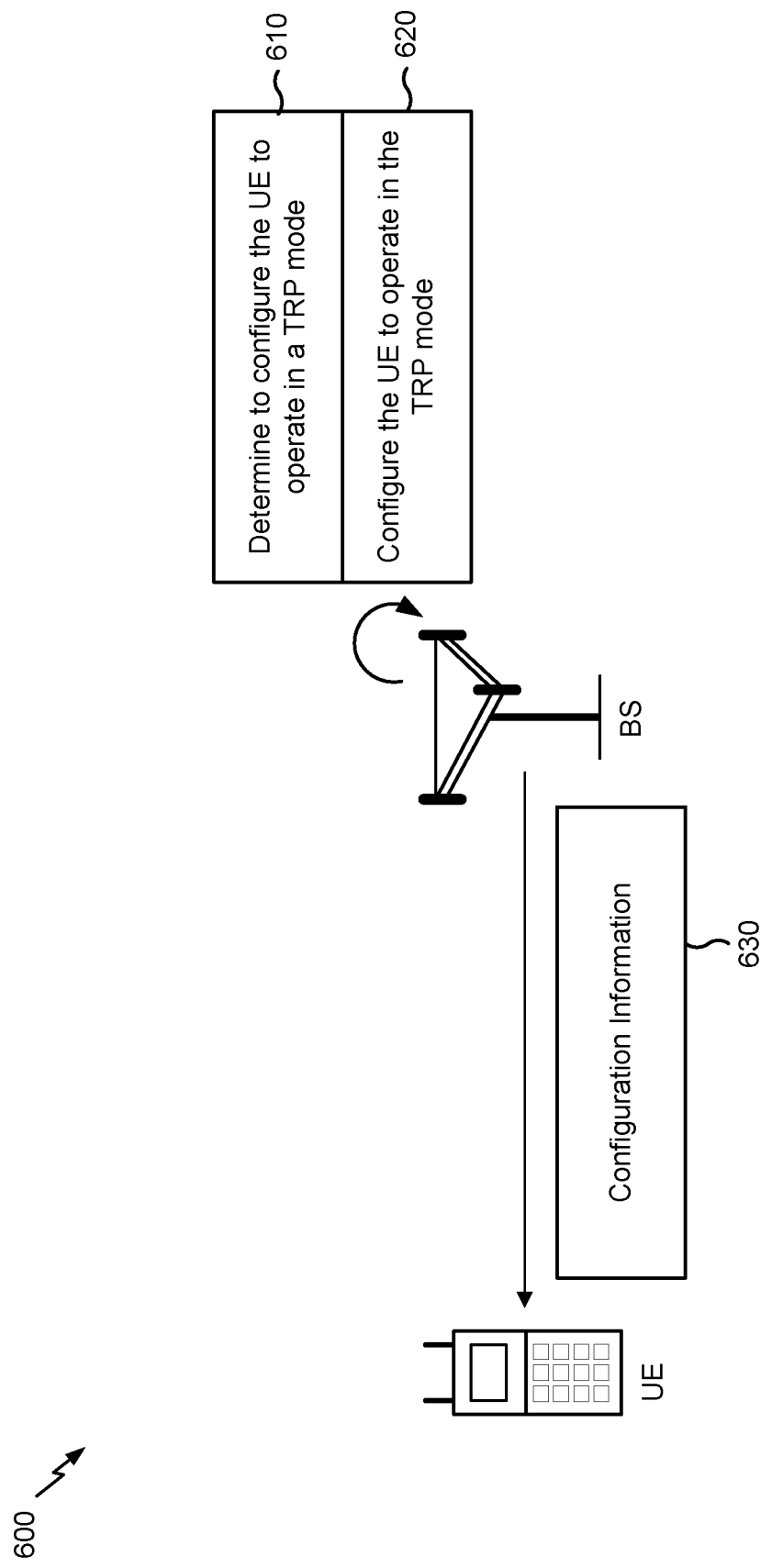
FIG. 6 is a diagram illustrating an example of configuring a user equipment to operate in a transmission/reception point (TRP) mode, in accordance with various aspects of the present disclosure.

FIG. 6 is a diagram illustrating an example 600 of configuring a user equipment to operate in a transmission/reception point (TRP) mode, in accordance with various aspects of the present disclosure. As shown in FIG. 6, example 600 may include a BS (e.g., BS 110) and a UE (e.g., UE 120).

As shown by reference number 610, the BS may determine to configure the UE to operate in a TRP mode. For example, the BS may determine to configure the UE to operate in a single TRP mode and/or in a multi-TRP mode. In some aspects, the BS may determine to configure the UE to operate in the TRP mode based at least in part on establishment of a connection between the UE and the BS. For example, the BS may determine to operate in the TRP mode after the UE and the BS establish a connection with each other. Additionally, or alternatively, the BS may determine to configure the UE to operate in the TRP mode after the UE attaches to the BS (e.g., as part of a network attachment procedure), during operation of the UE, and/or the like.

In some aspects, the BS may determine to switch the TRP mode in which the UE is operating based at least in part on establishment of a connection between the UE and the BS. For example, the UE may be initially configured in the single TRP mode to establish the connection and the BS may determine to configure the UE to operate in the multi-TRP mode after establishment of the connection. Additionally, or alternatively, the BS may determine to switch the TRP mode in association with initiating a power saving mode. For example, if the UE is operating in the multi-TRP mode, the BS may determine to switch the TRP mode to the single TRP mode in association with the UE initiating a power saving mode. Additionally, or alternatively, the BS may determine to switch the TRP mode to improve reliability and/or throughput associated with communications of the UE. For example, a particular TRP mode may be associated with higher reliability and/or throughput relative to another TRP mode, and the UE may determine to switch the TRP mode in which the UE is operating to improve the reliability and/or the throughput.

As further shown in FIG. 6, and by reference number 620, the BS may configure the UE to operate in the TRP mode. For example, the BS may configure the UE to operate in the TRP mode based at least in part on determining to configure the UE to operate in the TRP mode. In some aspects, the BS may configure the UE to operate in the TRP mode after determining to configure the UE to operate in the TRP mode, at a particular time, according to a schedule, based at least in part on being requested by the UE to configure the TRP mode, and/or the like.

In some aspects, the BS may configure the UE to operate in the multi-TRP mode on a per bandwidth part (BWP) basis. For example, the BS may configure the UE to operate in the multi-TRP mode for a first BWP as an operation mode of the first BWP, may configure the UE to operate in a single TRP mode for a second BWP as the operation mode of the second BWP, and/or the like. In some aspects, the BS may configure the UE to operate in the TRP mode by causing the UE to switch between the single TRP mode and the multi-TRP mode. For example, the BS may cause the UE to switch from a single TRP mode to a multi-TRP mode, or from a multi-TRP mode to a single TRP mode.

In some aspects, the BS may configure the UE to operate in the TRP mode based at least in part on a physical downlink shared channel (PDSCH) configuration, a physical downlink control channel (PDCCH) configuration, a PDCCH format, and/or the like. For example, the BS may cause the UE to operate in the TRP mode based at least in part on transmitting, to the UE, the PDSCH configuration, the PDCCH configuration, the PDCCH in a particular format, and/or the like. In some aspects, the multi-TRP mode may include a single PDCCH and single PDSCH mode, a multiple PDCCHs and multiple PDSCHs mode, and/or the like. For example, for the single PDCCH and single PDSCH mode, a single PDCCH may schedule a single PDSCH where separate layers of the PDSCH are transmitted from separate TRPs. Additionally, or alternatively, and as another example for the multiple PDCCHs and multiple PDSCHs mode, multiple PDCCHs may schedule a respective PDSCH where the PDSCHs are transmitted from a separate TRP, a first PDCCH and a first PDSCH may be associated with the first TRP and a second PDCCH and a second PDSCH may be associated with the second TRP, and/or the like.

In some aspects, the BS may configure the UE to operate in the multi-TRP mode using a field in radio resource control (RRC) signaling. For example, the BS may configure the UE to operate in the multi-TRP mode using a particular value configured in the field in the RRC signaling. In some aspects, a value of the field in a cell-level configuration may be associated with configuring the UE to operate in the multi-TRP mode for a set of bandwidth parts (BWPs) associated with the UE. Additionally, or alternatively, the value of the field in a BWP-level configuration may be associated with configuring the UE to operate in the multi-TRP mode for each BWP of the set of BWPs.

In some aspects, the BS may configure the UE to operate in the multi-TRP mode based at least in part on a PDSCH RRC signaling or a PDCCH RRC signaling transmitted from the BS. For example, the BS may configure the UE to operate in the multi-TRP mode by using modified PDSCH RRC signaling or modified PDCCH RRC signaling. Continuing with the previous example, a modification of the PDSCH RRC signaling or the PDCCH RRC signaling may indicate to the UE whether to operate in the single TRP mode or the multi-TRP mode. In some aspects, the BS may cause an RRC reconfiguration for the UE to switch between the single TRP mode and the multi-TRP mode.

In some aspects, the BS may configure the UE to operate in the multi-TRP mode based at least in part on configuring a downlink control information (DCI) format of DCI transmitted to the UE. For example, the BS may transmit DCI to the UE, where a DCI format of the DCI indicates to the UE to operate in the multi-TRP mode or the single TRP mode. In some aspects, the UE may decode additional PDCCH blind decoding hypotheses to decode the DCI format when the DCI format is used to indicate to the UE the TRP mode in which to operate.

In some aspects, there may be a conflict between configuring the UE to operate in the multi-TRP mode using a field in radio resource control (RRC) signaling, configuring the UE to operate in the multi-TRP mode based at least in part on the PDSCH RRC signaling or the PDCCH RRC signaling, and/or configuring the UE to operate in the multi-TRP mode based at least in part on configuring the DCI format. For example, based at least in part on the timing of transmissions from the BS, the UE may receive conflicting indications regarding which TRP mode the UE is to use. In some aspects, the UE may resolve this conflict based at least in part on a set of rules. For example, the set of rules may include instructions for the UE to resolve conflicts between manners of configuring the UE to operate in a TRP mode.

In some aspects, the BS may configure the UE to operate in the multi-TRP mode based at least in part on DCI of a PDCCH that indicates more than one transmission configuration indication (TCI) state.

In some aspects, when the multi-TRP mode is a single PDCCH and single PDSCH mode, the DCI may include a TCI field to indicate the more than one TCI state. Additionally, or alternatively, the DCI may indicate a set of quasi-co-location (QCL) relationships for different PDSCH layers corresponding to multiple TRPs associated with the multi-TRP mode. For example, the DCI may include multiple TCI fields that each identifies QCL of a PDSCH layer for one or more PDSCH ports, of the different PDSCH layers, associated with a TRP of the multiple TRPs. In some aspects, if the UE is configured with information that indicates that the multi-TRP mode is enabled or not enabled on the UE, then the UE may simply decode a single DCI format hypothesis. Otherwise, the UE may decode DCI formats for both the single TRP mode and the multi-TRP mode.

In some aspects, and for QCL of PDSCH indicated by the DCI, the TCI field may identify the QCL of a respective PDSCH layer of the multiple TRPs (e.g., may include values that identify the QCL of multiple PDSCH layers). For example, the DCI may include a single TCI field that is mapped to a respective QCL of multiple PDSCH layers (e.g., that are each associated with a TRP). Continuing with the previous example, for the multi-TRP mode, the TCI field may be mapped to the QCL of a first PDSCH layer associated with a first TRP, may be also mapped to the QCL of a second PDSCH layer associated with a second TRP, and so forth. In some aspects, the UE may need to be configured with information that indicates whether the multi-TRP mode is enabled to process the TCI field.

In some aspects, and for a multiple PDCCHs and multiple PDSCHs mode, the BS may configure the UE to operate in the multi-TRP mode by transmitting two DCI transmissions in two control resource sets (CORESETs) or in two search space sets in a same CORESET. In some aspects, each CORESET of the two CORESETS or each search space set of the two search space sets may be associated with a respective TRP. For example, a first CORESET or a first search space set may be associated with a first TRP, a second CORESET or a second search space may be associated with a second TRP, and so forth. In some aspects, the DCI may include a TCI field to identify a TCI state of a PDSCH, of the multiple PDSCHs (e.g., to explicitly identify the TCI state of the PDSCH). For example, a value configured in the TCI field may indicate the TCI state. Conversely, in some aspects, the DCI may not include the TCI field when two DCIs are transmitted in two CORESETs from two TRPs. In this case, in some aspects, the TCI state of a PDCCH, of the multiple PDCCHs, may be reused for the PDSCH associated with the PDCCH. This allows the BS to use fallback DCI for the multi-TRP mode, which may not include a TCI field associated with scheduling the multiple PDSCHs by the multiple PDCCHs.

In some aspects, and for the multiple PDCCHs and multiple PDSCHs mode, the BS may configure the UE to operate in the multi-TRP mode by transmitting two DCI transmissions in a same search space set from a same TRP. In some aspects, in this case, the DCI may identify a set of physical downlink control channel candidates that is reserved for each TRP, of multiple TRPs, associated with the multi-TRP mode. Additionally, or alternatively, the DCI may include a TCI field that indicates a TCI state of a TRP, of the multiple TRPs, associated with the TCI field.

In some aspects, PDSCH may be configured to support the multi-TRP mode. For example, a PDSCH configuration (e.g., a PDSCH RRC configuration) may be TRP dependent to cover a scenario where two TRPs include geographically/logically separated network transceivers and some resources and/or configurations are different between the two TRPs.

In some aspects, the BS may configure the UE to operate in the multi-TRP mode based at least in part on configuring an entire set of PDSCH configurations for each TRP, of multiple TRPs, associated with the multi-TRP mode. For example, the BS may configure a first set of PDSCH configurations for a first TRP, a second set of PDSCH configurations for a second TRP, and so forth. This provides an adaptable and/or scalable way to configure the UE via PDSCH configuration. In addition, this facilitates inclusion of the same or different values in fields associated with the PDSCH configuration across TRPs.

In some aspects, the BS may configure the UE to operate in the multi-TRP mode based at least in part on configuring a subset of a set of PDSCH configurations for each TRP, of multiple TRPs, associated with the multi-TRP mode (e.g., where a respective configuration of the subset of the set of PDSCH configurations is not constant across the multiple TRPs). For example, only fields associated with the PDSCH configuration that are allowed to be different across TRPs may be included in an array associated with the PDSCH configuration. Continuing with the previous example, the fields that are allowed to be different across TRPs may include a rate matching pattern field, a channel state information reference signal (CSI-RS) configuration field, and/or the like which are related to time and/or frequency resources available to TRPs and/or that may be different among TRPs at different locations in a network. In this case, there may be a single element in the array per TRP.

In some aspects, to support the multi-TRP mode, the PDSCH may need to be configured in additional manners. For example, and for a single PDCCH and single PDSCH mode, DCI transmitted to the UE based at least in part on configuring the UE to operate in the multi-TRP mode may include separate TCI fields in the DCI for each TRP, of multiple TRPs, associated with the multi-TRP mode. In some aspects, and continuing with the previous example, an element in a list of TCI states in a radio resource control (RRC) configuration may be associated with a single TRP (e.g., the list of TCI states may include a table of QCL properties in different indexes of the table).

Additionally, or alternatively, and continuing with the previous example, the DCI transmitted to the UE may include a single TCI field in the DCI to indicate PDSCH QCLs for the multiple TRPs. In some aspects, the element in the list of TCI states in the RRC configuration may be an indicator for the multiple TRPs (e.g., two TCI states for two TRPs, three TCI states for three TRPs, and so forth).

In some aspects, and for a single PDCCH and single PDSCH mode, a DCI format of the DCI or a size of the DCI may be based at least in part on the DCI including the separate TCI fields or the single TCI field.

In some aspects, and for a multiple PDCCHs and multiple PDSCHs mode, multiple PDSCHs may use a same list of TCI states in a radio resource control (RRC) configuration for each layer of one or more PDSCH ports quasi-co-location (QCL) associated with a TRP, of multiple TRPs, associated with the multi-TRP mode. For example, each element in the list of TCI states may be associated with a respective TRP. In this case, the multiple TRPs can use the same list of TCI states for each PDSCH port QCL associated with a TRP. In some aspects, if each element of the list of TCI states includes multiple TCI states for multiple TRPs, then each PDCCH may indicate TCI in the multiple TCI states (e.g., a first PDCCH may indicate first TCI, a second PDCCH may indicate second TCI, and so forth). In some aspects, the size of the PDCCHs may be the same if the PDCCHs are configured in a same CORESET (e.g., due to a presence or absence of some optional fields being CORESET dependent).

In some aspects, the BS may configure the UE to operate in the TRP mode based at least in part on a bandwidth part (BWP) switch (e.g., some BWPs may be configured and/or prepared for the multi-TRP mode and other BWPs may be configured and/or prepared for the single TRP mode). For example, a switch between the single TRP mode and the multi-TRP mode may be performed in associated with a BWP switch. Additionally, or alternatively, the BS may configure the UE to operate in the TRP mode based at least in part on a trigger to switch between the multi-TRP mode and the single-TRP mode within a BWP.

In some aspects, the BWP switch may be triggered by a radio resource control (RRC) configuration transmitted to the UE. For example, the RRC configuration may indicate a new active BWP, but may not update a configuration regarding a switch of the TRP mode of the new active BWP, and this may trigger the BWP switch. Alternatively, and continuing with the previous example, the RRC configuration may include an update of another configuration that changes the TRP mode of the new active BWP.

In some aspects, the BWP switch may be triggered by DCI transmitted to the UE. For example, the DCI may include a BWP indicator that indicates a different BWP that the UE is to use and this may trigger the BWP switch. In some aspects, the BWP switch may be triggered when a set of BWPs used by the UE before and after switching the BWP have different TRP modes (e.g., a first BWP and a second BWP may be configured with different TRP modes).

In some aspects, the trigger for a switch within a BWP may include a RRC-based trigger within the BWP. For example, a RRC reconfiguration of a BWP may be used to switch the TRP mode within the BWP. This provides flexibility with regard to switching the TRP mode, as values in the PDCCH and/or PDSCH RRC configurations can be updated.

Additionally, or alternatively, the trigger for a switch within a BWP may include a DCI-based trigger or a medium access control control element (MAC CE)-based trigger within the BWP. For example, DCI and/or a MAC CE may be used to switch the TRP mode. In some aspects, the BWP may have multiple TRP mode configurations that are each associated with one TRP mode. Additionally, or alternatively, a structure of a radio resource control (RRC) configuration received by the UE may be based at least in part on the multi-TRP mode. For example, the multi-TRP mode may be a default mode, and the single TRP mode may be specifically configured to be used. Continuing with the previous example, if there are multiple records associated with a respective TRP in the structure of the RRC configuration, then the UE may use a default record (e.g., a record in the first index of the structure) for the single TRP mode. For example, a first record in an array of TRP-dependent configuration may be used for the single TRP mode, a first TCI state of multiple TCI states in the TCI list for multiple TRPs may be used for the single TRP mode, and so forth. This provides a way of performing a faster switch in a BWP relative to using an RRC-based switch.

In some aspects, configuration of the UE to operate in the TRP mode may accommodate fallback DCI. In some aspects, to accommodate fallback DCI, TCI of a PDSCH associated with the TRP mode may be based at least in part on one TCI associated with a scheduling PDCCH. For example, TCI of a PDSCH may match TCI of a scheduling PDCCH. Additionally, or alternatively, to accommodate fallback DCI, a PDSCH configuration of a PDSCH may correspond to a specific index of an array of PDSCH configurations associated with multiple TRPs (e.g., for the multi-TRP mode).

Some aspects described herein may be applicable to downlink and/or uplink BWP. In some aspects, the BS may configure an uplink BWP and/or a downlink BWP based at least in part on determining to configure the UE to operate in the TRP mode. In some aspects, the uplink BWP and the downlink BWP may be configured independently. For example, the BS may configure an uplink BWP independently from a downlink BWP. In addition, in some aspects, configuration of the multi-TRP mode for an uplink BWP and a downlink BWP may be performed independently. In some aspects, the uplink BWP and the downlink BWP may be paired independently for paired spectrum deployment. For example, a single TRP downlink BWP or a multi-TRP downlink BWP may be paired with a single TRP uplink BWP or a multi-TRP uplink BWP for frequency division duplexing (FDD).

In some aspects, a first TRP mode associated with the uplink BWP and a second TRP mode associated with the downlink BWP may be switched in association with each other, or may be switched separately. For example, for time division duplexing (TDD), the downlink BWP and the uplink BWP may be switched together and, for FDD, the downlink BWP and the uplink BWP may be switched independently.

As shown by reference number 630, the BS may transmit, and the UE may receive, configuration information. For example, the BS may transmit the configuration information to configure the UE in the manner described elsewhere herein. In some aspects, the BS may transmit the configuration information based at least in part on establishment of a connection between the UE and the BS. Additionally, or alternatively, the BS may transmit the configuration information based at least in part on attachment of the UE to a network, at a scheduled time, based at least in part on receiving a request from the UE for the configuration information, and/or the like. In some aspects, the configuration information may include a PDCCH configuration, a PDSCH configuration, an RRC configuration, DCI, TCI, and/or the like, as described elsewhere herein.

As indicated above, FIG. 6 is provided as an example. Other examples are possible and may differ from what was described with respect to FIG. 6.

Figure 7A:
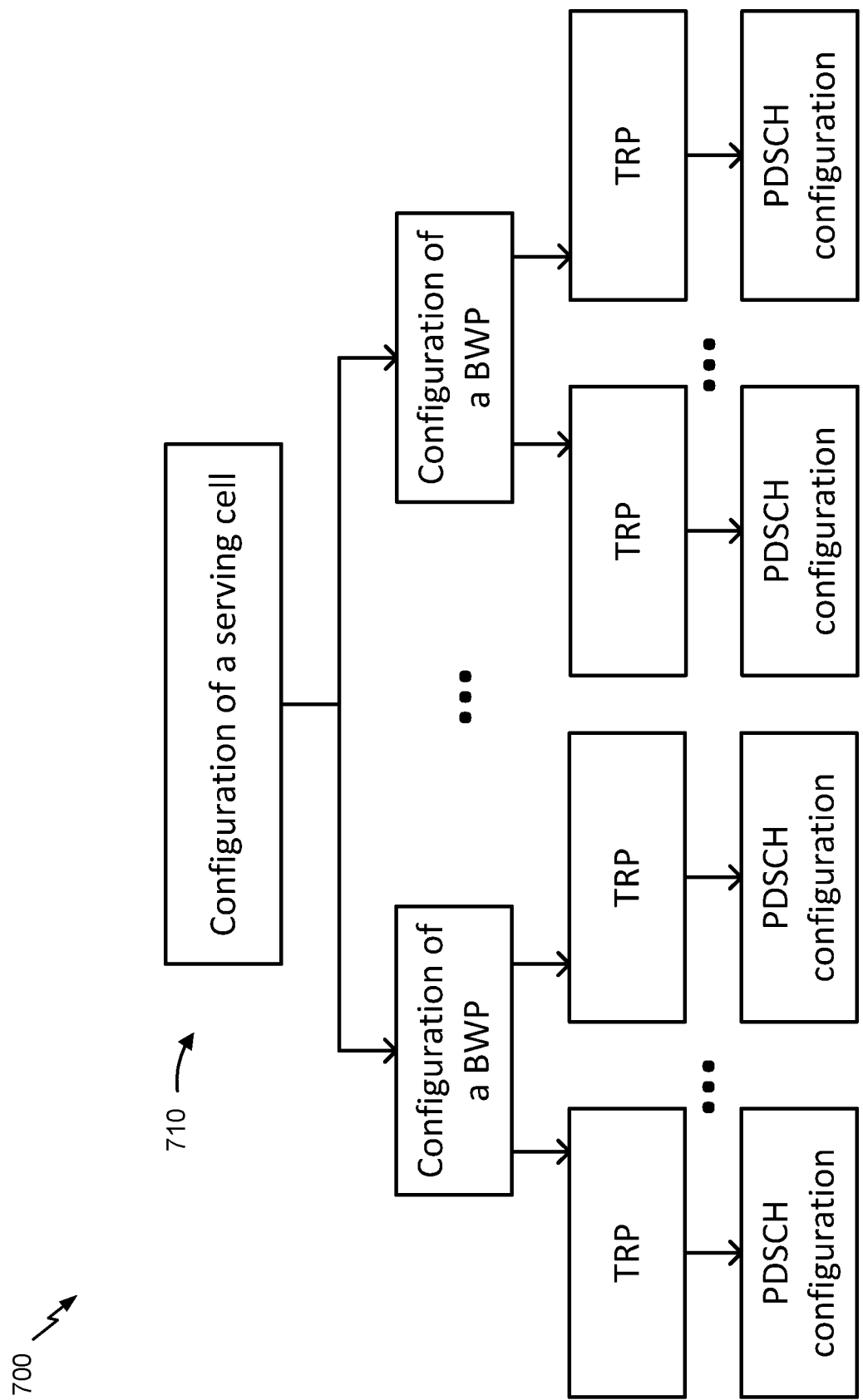
FIGS. 7A and 7B are diagrams illustrating an example of configuring a user equipment to operate in a transmission/reception point (TRP) mode, in accordance with various aspects of the present disclosure.
Figure 7B:
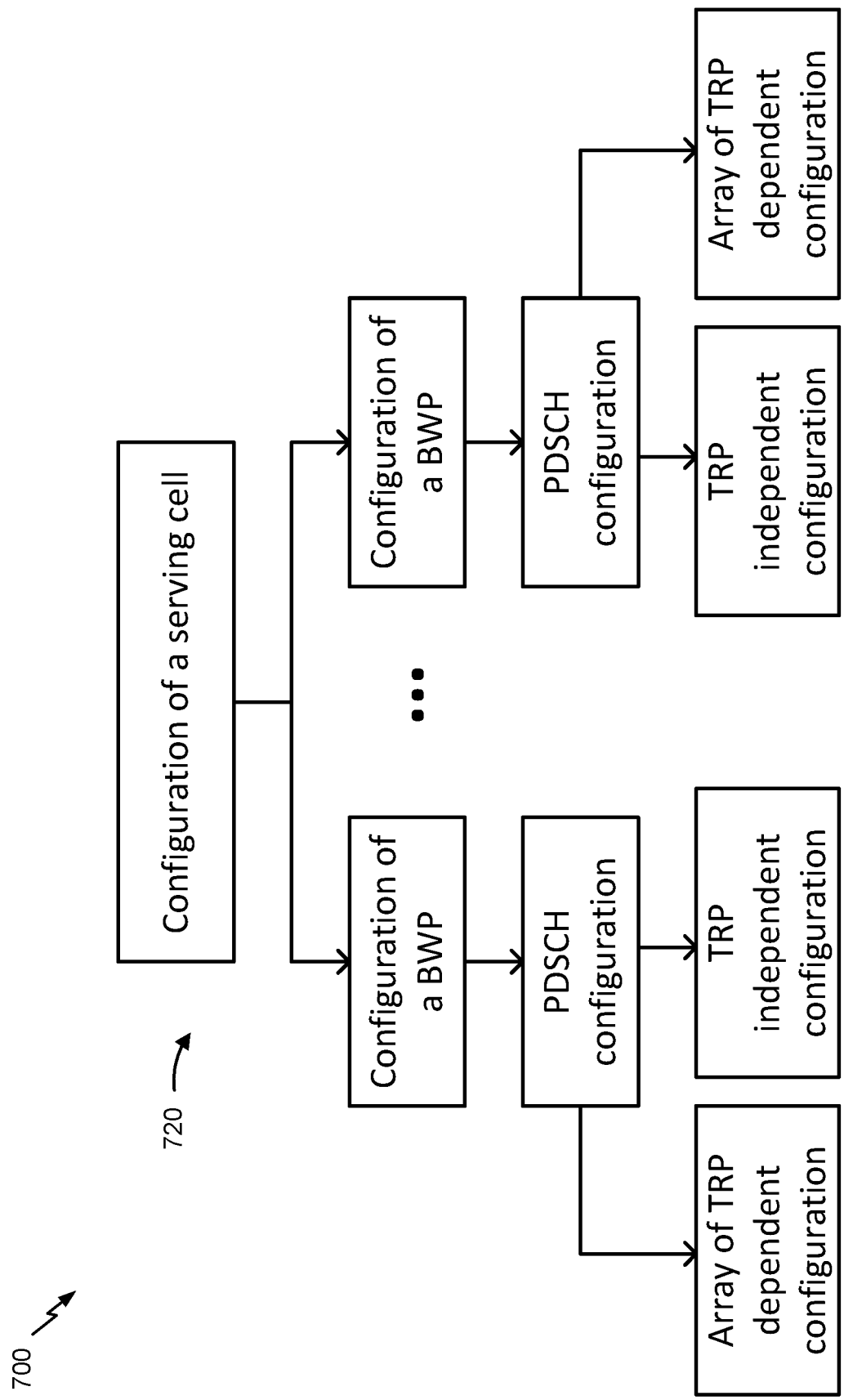

FIGS. 7A and 7B are diagrams illustrating an example 700 of configuring a user equipment to operate in a transmission/reception point (TRP) mode, in accordance with various aspects of the present disclosure. FIGS. 7A and 7B show various options for PDSCH configurations to support multi-TRP.

As shown in FIG. 7A, and by reference number 710, a configuration of a serving cell may include multiple configurations of a BWP. For example, the multiple BWPs associated with the serving cell may be configured on a per-BWP basis. As further shown in FIG. 7A, for a configuration of a BWP, multiple TRPs may be configured for the BWP. For a TRP, configuration of a serving cell may include a PDSCH configuration. In this way, the BS may configure, for the UE, a TRP separately from other TRPs using a PDSCH configuration dedicated to the TRP. In some aspects, the PDSCH configuration described with regard to 710 may include an array of TRP dependent configurations and TRP independent configurations, similar to that described below.

Turning to FIG. 7B, and as shown by reference number 720, a configuration of a serving cell may include multiple configurations of a BWP. For example, the multiple BWPs associated with the serving cell may be configured on a per-BWP basis. As further shown in FIG. 7B, for a configuration of a BWP, the BS may configure a PDSCH configuration. For example, the PDSCH configuration may be associated with a BWP, rather than being associated with a TRP, as was described with regard to FIG. 7A. For a PDSCH configuration, configuration of a serving cell may include an array of TRP dependent configurations and TRP independent configurations. For example, the array of TRP dependent configurations may be specific to a TRP (e.g., associated with a TRP), and the TRP independent configurations may be common across all TRPs (e.g., within a BWP or across BWPs). In this way, the BS may configure, for the UE, TRPs using a combination of TRP-dependent and TRP independent configurations. This reduces or eliminates a need to provide an entire set of PDSCH configurations for each TRP to be configured.

As indicated above, FIGS. 7A and 7B are provided as examples. Other examples are possible and may differ from what was described with respect to FIGS. 7A and 7B.

Figure 8:
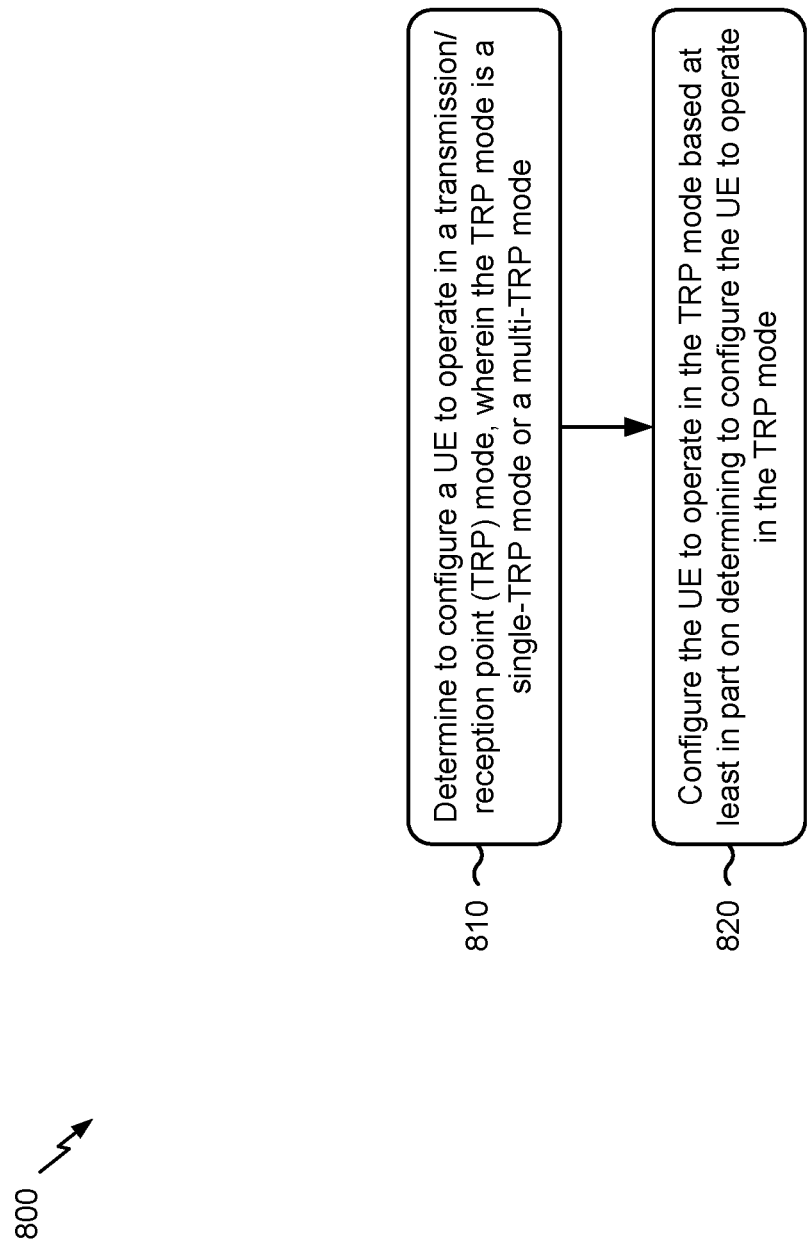
FIG. 8 is a diagram illustrating an example process performed, for example, by a base station, in accordance with various aspects of the present disclosure.

FIG. 8 is a diagram illustrating an example process 800 performed, for example, by a BS, in accordance with various aspects of the present disclosure. Example process 800 is an example where a BS (e.g., BS 110) performs configuration of a user equipment to operate in a transmission/reception point (TRP) mode.

As shown in FIG. 8, in some aspects, process 800 may include determining to configure a UE to operate in a transmission/reception point (TRP) mode, wherein the TRP mode is a single-TRP mode or a multi-TRP mode (block 810). For example, the BS (e.g., BS 110 using controller/processor 240 and/or the like) may determine to configure a UE to operate in a transmission/reception point (TRP) mode, in a manner that is the same as or similar to that described elsewhere herein. In some aspects, the TRP mode is a single-TRP mode or a multi-TRP mode.

As further shown in FIG. 8, in some aspects, process 800 may include configuring the UE to operate in the TRP mode based at least in part on determining to configure the UE to operate in the TRP mode (block 820). For example, the BS (e.g., BS 110 using controller/processor 240 transmit processor 220, TX MIMO processor 230, MOD 232, antenna 234, and/or the like) may configure the UE to operate in the TRP mode based at least in part on determining to configure the UE to operate in the TRP mode, in a manner that is the same as or similar to that described elsewhere herein.

Process 800 may include additional aspects, such as any single aspect or any combination of aspects described below and/or in connection with one or more other processes described elsewhere herein.

In some aspects, the BS may configure the UE to operate in the multi-TRP mode on a per bandwidth part (BWP) basis. In some aspects, the BS may configure the UE to operate in the TRP mode by causing the UE to switch between the single TRP mode and the multi-TRP mode. In some aspects, the BS may configure the UE to operate in the TRP mode based at least in part on at least one of: a physical downlink shared channel (PDSCH) configuration, a physical downlink control channel (PDCCH) configuration, or a PDCCH format.

In some aspects, the multi-TRP mode comprises: a single physical downlink control channel (PDCCH) and single physical downlink shared channel (PDSCH) mode, or a multiple PDCCHs and multiple PDSCHs mode. In some aspects, the BS may configure the UE to operate in the multi-TRP mode using a field in radio resource control (RRC) signaling, wherein a value of the field in a cell-level configuration is associated with configuring the UE to operate in the multi-TRP mode for a set of bandwidth parts (BWPs) associated with the UE, and wherein the value of the field in a BWP-level configuration is associated with configuring the UE to operate in the multi-TRP mode for each BWP of the set of BWPs.

In some aspects, the BS may configure the UE to operate in the multi-TRP mode based at least in part on a physical downlink shared channel (PDSCH) radio resource control (RRC) signaling or a physical downlink control channel (PDCCH) RRC signaling, wherein a configuration of the PDSCH RRC signaling or the PDCCH RRC signaling indicates to the UE to operate in the multi-TRP mode, or may configure the UE to operate in the multi-TRP mode based at least in part on configuring a downlink control information (DCI) format of DCI transmitted to the UE, wherein the DCI format indicates to the UE to operate in the multi-TRP mode. In some aspects, a conflict between configuring the UE to operate in the multi-TRP mode using a field in RRC signaling, configuring the UE to operate in the multi-TRP mode based at least in part on the PDSCH RRC signaling or the PDCCH RRC signaling, or configuring the UE to operate in the multi-TRP mode based at least in part on configuring the DCI format is resolved based at least in part on a set of rules.

In some aspects, the BS may configure the UE to operate in the multi-TRP mode based at least in part on downlink control information (DCI) of a physical downlink control channel (PDCCH) that indicates more than one transmission configuration indication (TCI) state. In some aspects, the multi-TRP mode is a single PDCCH and single physical downlink shared channel (PDSCH) mode, wherein the DCI includes a TCI field to indicate the more than one TCI state, wherein the DCI indicates a set of quasi-co-location (QCL) relationships for different PDSCH layers corresponding to multiple TRPs associated with the multi-TRP mode.

In some aspects, the DCI includes multiple TCI fields that each identifies QCL of a PDSCH layer for one or more PDSCH ports, of the different PDSCH layers, associated with a TRP of the multiple TRPs. In some aspects, the TCI field identifies the QCL of a respective PDSCH layer of the multiple TRPs.

In some aspects, the BS may configure the UE to operate in the multi-TRP mode by transmitting two downlink control information (DCI) transmissions in two control resource sets (CORESETs) or in two search space sets in a same CORESET, wherein each CORESET of the two CORESETS or each search space set of the two search space sets is associated with a respective TRP, wherein the multi-TRP mode is a multiple physical downlink control channels (PDCCHs) and multiple physical downlink shared channels (PDSCHs) TRP mode. In some aspects, the DCI includes a transmission configuration indication (TCI) field to identify a TCI state of a PDSCH, of the multiple PDSCHs, or does not include the TCI field when two DCIs are transmitted in two CORESETs from two TRPs, wherein the TCI state of a PDCCH, of the multiple PDCCHs, is reused for the PDSCH associated with the PDCCH.

In some aspects, the BS may configure the UE to operate in the multi-TRP mode by transmitting two downlink control information (DCI) transmissions in a same search space set from a same TRP, wherein the DCI identifies a set of physical downlink control channel candidates that is reserved for each TRP, of multiple TRPs, associated with the multi-TRP mode, wherein the DCI includes a transmission configuration indication (TCI) field that indicates a TCI state of a TRP, of the multiple TRPs, associated with the TCI field, wherein the multi-TRP mode is a multiple physical downlink control channels (PDCCHs) and multiple physical downlink shared channels (PDSCHs) TRP mode. In some aspects, the BS may configure the UE to operate in the multi-TRP mode based at least in part on configuring an entire set of physical downlink shared channel (PDSCH) configurations for each TRP, of multiple TRPs, associated with the multi-TRP mode.

In some aspects, the BS may configure the UE to operate in the multi-TRP mode based at least in part on configuring a subset of a set of physical downlink shared channel (PDSCH) configurations for each TRP, of multiple TRPs, associated with the multi-TRP mode, wherein a respective configuration of the subset of the set of PDSCH configurations is not constant across the multiple TRPs. In some aspects, the multi-TRP mode is a single physical downlink shared channel (PDCCH) and single physical downlink shared channel (PDSCH) mode, wherein downlink control information (DCI) transmitted to the UE based at least in part on configuring the UE to operate in the multi-TRP mode includes: separate transmission configuration indication (TCI) fields in the DCI for each TRP, of multiple TRPs, associated with the multi-TRP mode, wherein an element in a list of TCI states in a radio resource control (RRC) configuration is associated with a single TRP, or a single TCI field in the DCI to indicate PDSCH quasi-co-locations (QCLs) for the multiple TRPs, wherein the element in the list of TCI states in the RRC configuration is an indicator for the multiple TRPs, wherein a DCI format of the DCI or a size of the DCI is based at least in part on the DCI including the separate TCI fields or the single TCI field.

In some aspects, the multi-TRP mode is a multiple physical downlink control channels (PDCCHs) and multiple physical downlink shared channels (PDSCHs) mode, wherein multiple PDSCHs use a same list of transmission configuration indication (TCI) states in a radio resource control (RRC) configuration for each layer of one or more PDSCH ports quasi-co-location (QCL) associated with a TRP, of multiple TRPs, associated with the multi-TRP mode, wherein each element in the same list of TCI states is associated with one TRP, or wherein the multiple PDCCHs indicate TCI in a respective TCI state in the same list of TCI states, wherein the each element in the same list of TCI states identifies multiple TCI states. In some aspects, the BS may configure the UE to operate in the TRP mode based at least in part on a bandwidth part (BWP) switch, or may configure the UE to operate in the TRP mode based at least in part on a trigger to switch between the multi-TRP mode and the single-TRP mode within a BWP.

In some aspects, the BWP switch is triggered by a radio resource control (RRC) configuration transmitted to the UE, wherein the RRC configuration indicates a new active BWP but does not update a configuration regarding a switch of the TRP mode of the new active BWP, wherein the RRC configuration includes an update of another configuration that changes the TRP mode of the new active BWP. In some aspects, the BWP switch is triggered by downlink control information (DCI) transmitted to the UE, wherein the DCI includes a BWP indicator that indicates a different BWP that the UE is to use.

In some aspects, the BWP switch is triggered when a set of BWPs used by the UE before and after switching the TRP mode within the BWP have different TRP modes. In some aspects, the trigger is a radio resource control (RRC)-based trigger within the BWP. In some aspects, the trigger is a downlink control information (DCI)-based trigger or a medium access control control element (MAC CE)-based trigger within the BWP. In some aspects, the BWP has multiple TRP mode configurations that are each associated with one TRP mode, or a structure of a radio resource control (RRC) configuration received by the UE is based at least in part on the multi-TRP mode.

In some aspects, transmission configuration indication (TCI) of a physical downlink shared channel (PDSCH) associated with the TRP mode is based at least in part on other TCI associated with a scheduling physical downlink control channel (PDCCH). In some aspects, a physical downlink shared channel (PDSCH) configuration of a PDSCH corresponds to a specific index of an array of PDSCH configurations associated with multiple TRPs, wherein the TRP mode is the multi-TRP mode.

In some aspects, the BS may configure an uplink bandwidth part (BWP) or a downlink BWP based at least in part on determining to configure the UE to operate in the TRP mode. In some aspects, the uplink BWP and the downlink BWP are configured independently. In some aspects, the uplink BWP and the downlink BWP are paired independently for paired spectrum deployment.

In some aspects, a first TRP mode associated with the uplink BWP and a second TRP mode associated with the downlink BWP are switched in association with each other, or are switched separately. In some aspects, the BS may determine to configure the UE to operate in the TRP mode based at least in part on establishment of a connection between the UE and the BS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
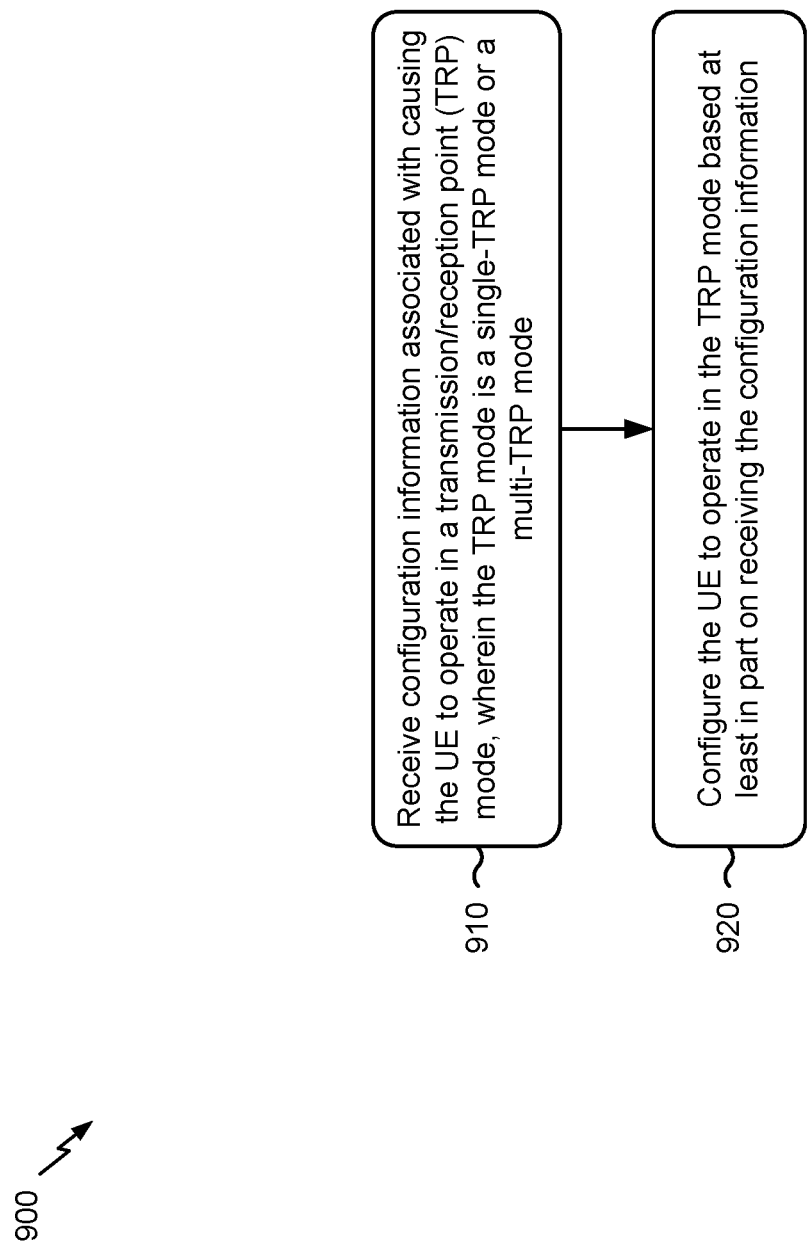
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs configuration of a user equipment to operate in a transmission/reception point (TRP) mode.

As shown in FIG. 9, in some aspects, process 900 may include receiving configuration information associated with causing the UE to operate in a transmission/reception point (TRP) mode, wherein the TRP mode is a single-TRP mode or a multi-TRP mode (block 910). For example, the UE (e.g., UE 120 using antenna 252, DEMOD 254, MIMO detector 256, receive processor 258, controller/processor 280, and/or the like) may receive configuration information associated with causing the UE to operate in a transmission/reception point (TRP) mode, in a manner that is the same as or similar to that described elsewhere herein. In some aspects, the TRP mode is a single-TRP mode or a multi-TRP mode.

As further shown in FIG. 9, in some aspects, process 900 may include configuring the UE to operate in the TRP mode based at least in part on receiving the configuration information (block 920). For example, the UE (e.g., UE 120 using controller/processor 280 and/or the like) may configure the UE to operate in the TRP mode based at least in part on receiving the configuration information, in a manner that is the same as or similar to that described elsewhere herein.

Process 900 may include additional aspects, such as any single aspect or any combination of aspects described below and/or in connection with one or more other processes described elsewhere herein.

In some aspects, the UE may configure the UE to operate in the multi-TRP mode on a per bandwidth part (BWP) basis. In some aspects, the UE may configure the UE to operate in the TRP mode by causing the UE to switch between the single TRP mode and the multi-TRP mode. In some aspects, the UE may configure the UE to operate in the TRP mode based at least in part on at least one of: a physical downlink shared channel (PDSCH) configuration included in the configuration information, a physical downlink control channel (PDCCH) configuration included in the configuration information, or a PDCCH format included in the configuration information.

In some aspects, the multi-TRP mode comprises: a single physical downlink control channel (PDCCH) and single physical downlink shared channel (PDSCH) mode, or a multiple PDCCHs and multiple PDSCHs mode. In some aspects, the UE may configure the UE to operate in the multi-TRP mode based at least in part on a field in radio resource control (RRC) signaling from a base station (BS), wherein a value of the field in a cell-level configuration is associated with configuring the UE to operate in the multi-TRP mode for a set of bandwidth parts (BWPs) associated with the UE, and wherein the value of the field in a BWP-level configuration is associated with configuring the UE to operate in the multi-TRP mode for each BWP of the set of BWPs.

In some aspects, the UE may configure the UE to operate in the multi-TRP mode based at least in part on a physical downlink shared channel (PDSCH) radio resource control (RRC) signaling from a base station (BS) or a physical downlink control channel (PDCCH) RRC signaling from the BS, wherein a configuration of the PDSCH RRC signaling or the PDCCH RRC signaling causes the UE to determine to operate in the multi-TRP mode, or may configure the UE to operate in the multi-TRP mode based at least in part on a downlink control information (DCI) format of DCI received by the UE from the BS, wherein the DCI format causes the UE to determine to operate in the multi-TRP mode. In some aspects, a conflict between configuring the UE to operate in the multi-TRP mode using a field in RRC signaling, configuring the UE to operate in the multi-TRP mode based at least in part on the PDSCH RRC signaling or the PDCCH RRC signaling, or configuring the UE to operate in the multi-TRP mode based at least in part on configuring the DCI format is resolved based at least in part on a set of rules.

In some aspects, the UE may configure the UE to operate in the multi-TRP mode based at least in part on downlink control information (DCI) of a physical downlink control channel (PDCCH) received by the UE that indicates more than one transmission configuration indication (TCI) state. In some aspects, the multi-TRP mode is a single PDCCH and single physical downlink shared channel (PDSCH) mode, wherein the DCI includes a TCI field to indicate the more than one TCI state, wherein the DCI indicates a set of quasi-co-location (QCL) relationships for different PDSCH layers corresponding to multiple TRPs associated with the multi-TRP mode.

In some aspects, the DCI includes multiple TCI fields that each identifies QCL of a PDSCH layer for one or more PDSCH ports, of the different PDSCH layers, associated with a TRP of the multiple TRPs. In some aspects, the TCI field identifies the QCL of a respective PDSCH layer of the multiple TRPs.

In some aspects, the UE may configure the UE to operate in the multi-TRP mode based at least in part on receiving two downlink control information (DCI) transmissions in two control resource sets (CORESETs) or in two search space sets in a same CORESET, wherein each CORESET of the two CORESETS or each search space set of the two search space sets is associated with a respective TRP, wherein the multi-TRP mode is a multiple physical downlink control channels (PDCCHs) and multiple physical downlink shared channels (PDSCHs) TRP mode. In some aspects, the DCI: includes a transmission configuration indication (TCI) field to identify a TCI state of a PDSCH, of the multiple PDSCHs, or does not include the TCI field when two DCIs are transmitted in two CORESETs from two TRPs, wherein the TCI state of a PDCCH, of the multiple PDCCHs, is reused for the PDSCH associated with the PDCCH.

In some aspects, the UE may configure the UE to operate in the multi-TRP mode based at least in part on receiving two downlink control information (DCI) transmissions in a same search space set from a same TRP, wherein the DCI identifies a set of physical downlink control channel candidates that is reserved for each TRP, of multiple TRPs, associated with the multi-TRP mode, wherein the DCI includes a transmission configuration indication (TCI) field that indicates a TCI state of a TRP, of the multiple TRPs, associated with the TCI field, wherein the multi-TRP mode is a multiple physical downlink control channels (PDCCHs) and multiple physical downlink shared channels (PDSCHs) TRP mode. In some aspects, the UE may configure the UE to operate in the multi-TRP mode based at least in part on configuring an entire set of physical downlink shared channel (PDSCH) configurations for each TRP, of multiple TRPs, associated with the multi-TRP mode.

In some aspects, the UE may configure the UE to operate in the multi-TRP mode based at least in part on configuring a subset of a set of physical downlink shared channel (PDSCH) configurations for each TRP, of multiple TRPs, associated with the multi-TRP mode, wherein a respective configuration of the subset of the set of PDSCH configurations is not constant across the multiple TRPs. In some aspects, the multi-TRP mode is a single physical downlink shared channel (PDCCH) and single physical downlink shared channel (PDSCH) mode, wherein downlink control information (DCI) received by the UE based at least in part on receiving the configuration information includes: separate transmission configuration indication (TCI) fields in the DCI for each TRP, of multiple TRPs, associated with the multi-TRP mode, wherein one element in a list of TCI states in a radio resource control (RRC) configuration is associated with one TRP, or a single TCI field in the DCI to indicate PDSCH quasi-co-locations (QCLs) for the multiple TRPs, wherein an element in the list of TCI states in the RRC configuration is an indicator for the multiple TRPs, wherein a DCI format of the DCI or a size of the DCI is based at least in part on the DCI including the separate TCI fields or the single TCI field.

In some aspects, the multi-TRP mode is a multiple physical downlink control channels (PDCCHs) and multiple physical downlink shared channels (PDSCHs) mode, wherein multiple PDSCHs use a same list of transmission configuration indication (TCI) states in a radio resource control (RRC) configuration for each layer of one or more PDSCH ports quasi-co-location (QCL) associated with a TRP, of multiple TRPs, associated with the multi-TRP mode, wherein each element in the same list of TCI states is associated with one TRP, or wherein the multiple PDCCHs indicate TCI in a respective TCI state in the same list of TCI states, wherein the each element in the same list of TCI states identifies multiple TCI states. In some aspects, the UE may determine to switch between the single TRP mode and the multi-TRP mode prior to receiving the configuration information to establish a connection to a network, to initiate a power saving mode, or to improve reliability or throughput associated with communications of the UE. In some aspects, the UE may configure the UE to operate in the TRP mode based at least in part on a bandwidth part (BWP) switch, or may configure the UE to operate in the TRP mode based at least in part on a trigger to switch between the multi-TRP mode and the single-TRP mode within a BWP.

In some aspects, the BWP switch is triggered by a radio resource control (RRC) configuration received by the UE, wherein the RRC configuration indicates a new active BWP but does not update a configuration regarding a switch of the TRP mode of the new active BWP, wherein the RRC configuration includes an update of another configuration that changes the TRP mode of the new active BWP. In some aspects, the BWP switch is triggered by downlink control information (DCI) received by the UE, wherein the DCI includes a BWP indicator that indicates a different BWP that the UE is to use.

In some aspects, the BWP switch is triggered when a set of BWPs used by the UE before and after switching the TRP mode within the BWP have different TRP modes. In some aspects, the trigger is a radio resource control (RRC)-based trigger within the BWP. In some aspects, the trigger is a downlink control information (DCI)-based trigger or a medium access control control element (MAC CE)-based trigger within the BWP.

In some aspects, the BWP has multiple TRP mode configurations that are each associated with one TRP mode, or a structure of a radio resource control (RRC) configuration received by the UE is based at least in part on the multi-TRP mode. In some aspects, transmission configuration indication (TCI) of a physical downlink shared channel (PDSCH)

associated with the TRP mode is based at least in part on other TCI associated with a scheduling physical downlink control channel (PDCCH). In some aspects, a physical downlink shared channel (PDSCH) configuration of a PDSCH corresponds to a specific index of an array of PDSCH configurations associated with multiple TRPs, wherein the TRP mode is the multi-TRP mode.

In some aspects, the UE may configure an uplink bandwidth part (BWP) or a downlink BWP based at least in part on receiving the configuration information. In some aspects, the uplink BWP and the downlink BWP are configured independently. In some aspects, the uplink BWP and the downlink BWP are paired independently for paired spectrum deployment.

In some aspects, a first TRP mode associated with the uplink BWP and a second TRP mode associated with the downlink BWP are switched in association with each other, or are switched separately. In some aspects, the UE may receive the configuration information based at least in part on establishment of a connection between the UE and the BS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
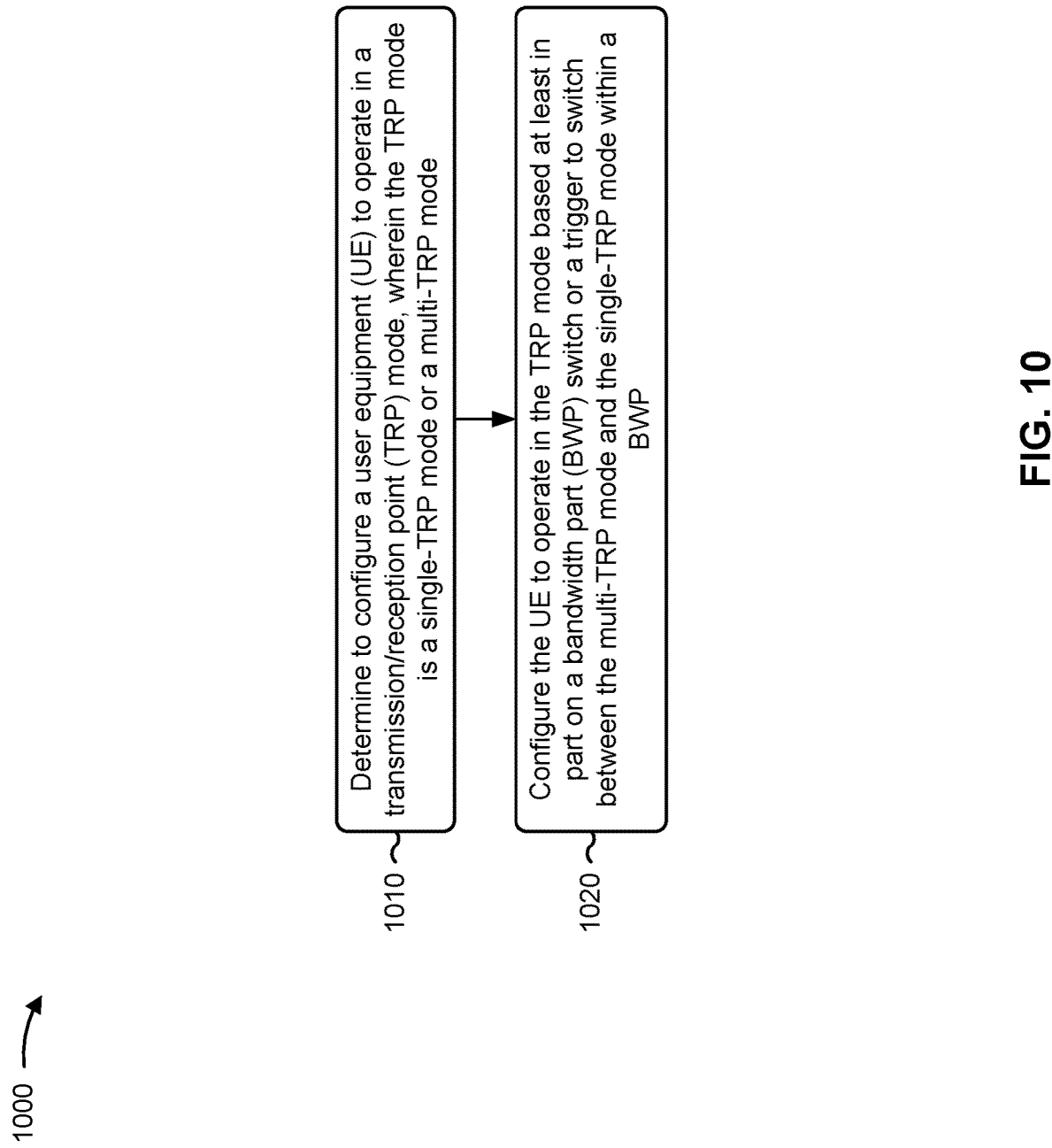
FIG. 10 is a diagram illustrating another example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where a base station (e.g., base station 110 and/or the like) performs operations associated with configuring a UE to operate in a TRP mode.

As shown in FIG. 10, in some aspects, process 1000 may include determining to configure a user equipment (UE) to operate in a transmission/reception point (TRP) mode, wherein the TRP mode is a single-TRP mode or a multi-TRP mode (block 1010). For example, the base station (e.g., using transmit processor 220, receive processor 238, controller/processor 240, memory 242, and/or the like) may determine to configure a user equipment (UE) to operate in a transmission/reception point (TRP) mode, as described above. In some aspects, the TRP mode is a single-TRP mode or a multi-TRP mode.

As further shown in FIG. 10, in some aspects, process 1000 may include configuring the UE to operate in the TRP mode based at least in part on a bandwidth part (BWP) switch or a trigger to switch between the multi-TRP mode and the single-TRP mode within a BWP (block 1020). For example, the base station (e.g., using transmit processor 220, receive processor 238, controller/processor 240, memory 242, and/or the like) may configure the UE to operate in the TRP mode based at least in part on a bandwidth part (BWP) switch or a trigger to switch between the multi-TRP mode and the single-TRP mode within a BWP, as described above.

Process 1000 may include additional aspects, such as any single aspect or any combination of aspects described below and/or in connection with one or more other processes described elsewhere herein.

In a first aspect, the UE is configured to operate in the TRP mode on a per bandwidth part (BWP) basis.

In a second aspect, alone or in combination with the first aspect, the UE is configured to operate in the TRP mode further based at least in part on at least one of: a physical downlink shared channel (PDSCH) configuration, a physical downlink control channel (PDCCH) configuration, a PDCCH format, or a combination thereof.

In a third aspect, alone or in combination with one or more of the first and second aspects, configuring the UE to operate in the TRP mode comprises: configuring the UE to operate in the multi-TRP mode using a field in radio resource control (RRC) signaling, and a value of the field in a cell-level configuration is associated with configuring the UE to operate in the multi-TRP mode for a set of bandwidth parts (BWPs) associated with the UE, and the value of the field in a BWP-level configuration is associated with configuring the UE to operate in the multi-TRP mode for each BWP of the set of BWPs.

In a fourth aspect, alone or in combination with one or more of the first through third aspects, configuring the UE to operate in the TRP mode comprises: configuring the UE to operate in the multi-TRP mode based at least in part on a physical downlink shared channel (PDSCH) radio resource control (RRC) signaling, and a configuration of the PDSCH RRC signaling or the PDCCH RRC signaling indicates to the UE to operate in the multi-TRP mode; or configuring the UE to operate in the multi-TRP mode based at least in part on configuring a downlink control information (DCI) parameter in DCI transmitted to the UE, and the DCI parameter indicates to the UE to operate in the multi-TRP mode.

In a fifth aspect, alone or in combination with one or more of the first through fourth aspects, configuring the UE to operate in the TRP mode comprises: configuring the UE to operate in the multi-TRP mode based at least in part on downlink control information (DCI) of a physical downlink control channel (PDCCH) that indicates more than one transmission configuration indication (TCI) state.

In a sixth aspect, alone or in combination with one or more of the first through fifth aspects, the multi-TRP mode is a single PDCCH and single physical downlink shared channel (PDSCH) mode, and the DCI includes a TCI field to indicate the more than one TCI state, and the DCI indicates a set of quasi-co-location (QCL) relationships for different PDSCH layers corresponding to multiple TRPs associated with the multi-TRP mode.

In a seventh aspect, alone or in combination with one or more of the first through sixth aspects, configuring the UE to operate in the TRP mode comprises: configuring the UE to operate in the multi-TRP mode by transmitting two downlink control information (DCI) transmissions in two control resource sets (CORESETs) or in two search space sets in a same CORESET, and each CORESET of the two CORESETS or each search space set of the two search space sets is associated with a respective TRP, and the multi-TRP mode is a multiple physical downlink control channels (PDCCHs) and multiple physical downlink shared channels (PDSCHs) TRP mode.

In an eighth aspect, alone or in combination with one or more of the first through seventh aspects, the DCI: includes a transmission configuration indication (TCI) field to identify a TCI state of a PDSCH, of the multiple PDSCHs, or does not include the TCI field when two DCIs are transmitted in two CORESETs from two TRPs, and the TCI state of a PDCCH, of the multiple PDCCHs, is reused for the PDSCH associated with the PDCCH.

In a ninth aspect, alone or in combination with one or more of the first through eighth aspects, configuring the UE to operate in the TRP mode comprises: configuring the UE to operate in the multi-TRP mode by transmitting two downlink control information (DCI) transmissions in a same search space set from a same TRP, and the DCI identifies a set of physical downlink control channel candidates that is reserved for each TRP, of multiple TRPs, associated with the multi-TRP mode, and the DCI includes a transmission configuration indication (TCI) field that indicates a TCI state of a TRP, of the multiple TRPs, associated with the TCI field, and the multi-TRP mode is a multiple physical downlink control channels (PDCCHs) and multiple physical downlink shared channels (PDSCHs) TRP mode.

In a tenth aspect, alone or in combination with one or more of the first through ninth aspects, configuring the UE to operate in the TRP mode comprises: configuring the UE to operate in the multi-TRP mode based at least in part on configuring an entire set of physical downlink shared channel (PDSCH) configurations for each TRP, of multiple TRPs, associated with the multi-TRP mode; or configuring the UE to operate in the multi-TRP mode based at least in part on configuring a subset of a set of physical downlink shared channel (PDSCH) configurations for each TRP, of multiple TRPs, associated with the multi-TRP mode, and a respective configuration of the subset of the set of PDSCH configurations is not constant across the multiple TRPs.

In an eleventh aspect, alone or in combination with one or more of the first through tenth aspects, the BWP switch is triggered by a radio resource control (RRC) configuration transmitted to the UE, and the RRC configuration indicates a new active BWP but does not update a configuration regarding a switch of the TRP mode of the new active BWP, and the RRC configuration includes an update of another configuration that changes the TRP mode of the new active BWP.

In a twelfth aspect, alone or in combination with one or more of the first through eleventh aspects, the trigger is a radio resource control (RRC)-based trigger within the BWP, a downlink control information (DCI)-based trigger, or a medium access control control element (MAC CE)-based trigger within the BWP.

In a thirteenth aspect, alone or in combination with one or more of the first through twelfth aspects, the BWP has multiple TRP mode configurations that are each associated with one TRP mode, or a structure of a radio resource control (RRC) configuration received by the UE is based at least in part on the multi-TRP mode.

In a fourteenth aspect, alone or in combination with one or more of the first through thirteenth aspects, a physical downlink shared channel (PDSCH) configuration of a PDSCH corresponds to a specific index of an array of PDSCH configurations associated with multiple TRPs, and the TRP mode is the multi-TRP mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
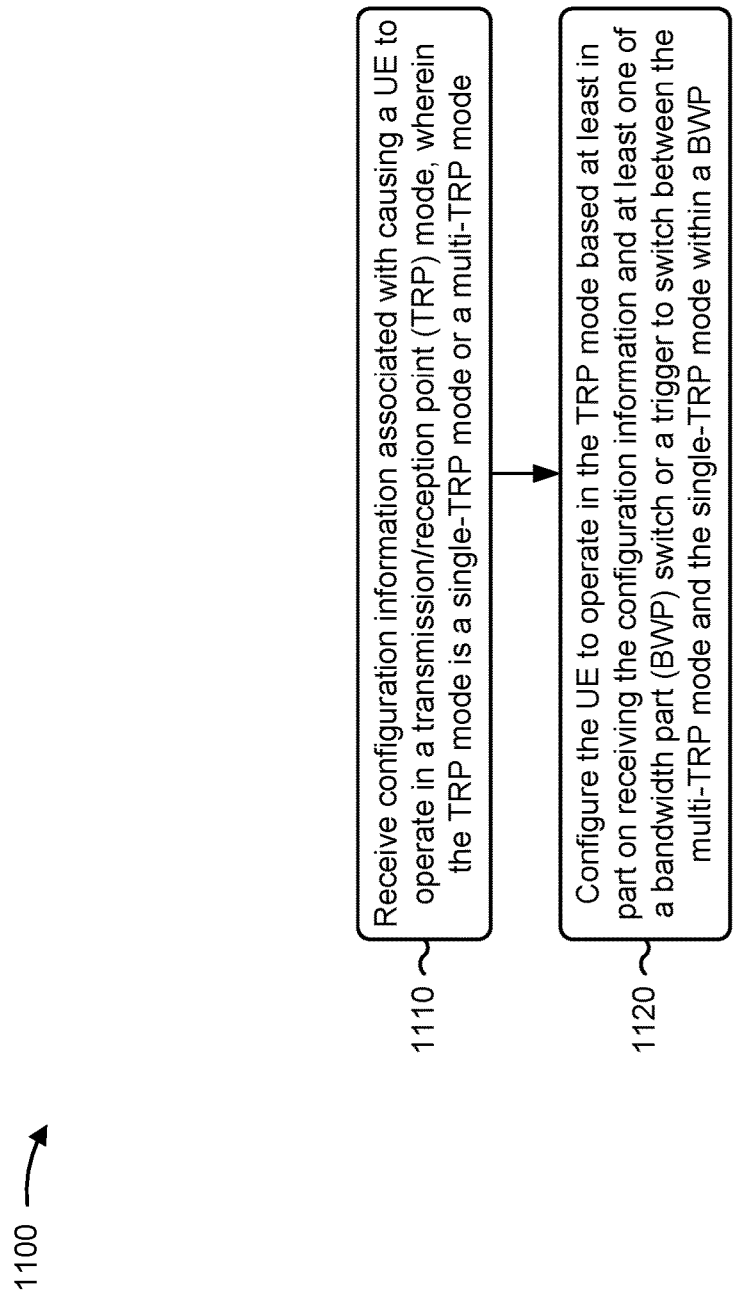
FIG. 11 is a diagram illustrating another example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120 and/or the like) performs operations associated with configuring the UE to operate in a TRP mode.

As shown in FIG. 11, in some aspects, process 1100 may include receiving configuration information associated with causing the UE to operate in a transmission/reception point (TRP) mode, wherein the TRP mode is a single-TRP mode or a multi-TRP mode (block 1110). For example, the UE (e.g., using receive processor 258, controller/processor 280, memory 282, and/or the like) may receive configuration information associated with causing the UE to operate in a transmission/reception point (TRP) mode, as described above. In some aspects, the TRP mode is a single-TRP mode or a multi-TRP mode.

As further shown in FIG. 11, in some aspects, process 1100 may include configuring the UE to operate in the TRP mode based at least in part on receiving the configuration information and at least one of a bandwidth part (BWP) switch or a trigger to switch between the multi-TRP mode and the single-TRP mode within a BWP (block 1120). For example, the UE (e.g., using receive processor 258, transmit processor 264, controller/processor 280, memory 282, and/or the like) may configure the UE to operate in the TRP mode based at least in part on receiving the configuration information and at least one of a bandwidth part (BWP) switch or a trigger to switch between the multi-TRP mode and the single-TRP mode within a BWP, as described above.

Process 1100 may include additional aspects, such as any single aspect or any combination of aspects described below and/or in connection with one or more other processes described elsewhere herein.

In a first aspect, the UE is configured to operate in the multi-TRP mode on a per bandwidth part (BWP) basis.

In a second aspect, alone or in combination with the first aspect, the UE is configured to operate in the TRP mode based at least in part on at least one of: a physical downlink shared channel (PDSCH) configuration included in the configuration information, a physical downlink control channel (PDCCH) configuration included in the configuration information, a PDCCH format included in the configuration information, or a combination thereof.

In a third aspect, alone or in combination with one or more of the first and second aspects, the UE is configured to operate in the multi-TRP mode based at least in part on a field in radio resource control (RRC) signaling from a base station (BS), and a value of the field in a cell-level configuration is associated with configuring the UE to operate in the multi-TRP mode for a set of bandwidth parts (BWPs) associated with the UE, and the value of the field in a BWP-level configuration is associated with configuring the UE to operate in the multi-TRP mode for each BWP of the set of BWPs.

In a fourth aspect, alone or in combination with one or more of the first through third aspects, the UE is configured to operate in the multi-TRP mode based at least in part on a physical downlink shared channel (PDSCH) radio resource control (RRC) signaling from a base station (BS) or a physical downlink control channel (PDCCH) RRC signaling from the BS, and a configuration of the PDSCH RRC signaling or the PDCCH RRC signaling causes the UE to determine to operate in the multi-TRP mode; or configuring the UE to operate in the multi-TRP mode based at least in part on a downlink control information (DCI) parameter of DCI received by the UE from the BS, and the DCI parameter causes the UE to determine to operate in the multi-TRP mode.

In a fifth aspect, alone or in combination with one or more of the first through fourth aspects, the UE is configured to operate in the multi-TRP mode based at least in part on downlink control information (DCI) of a physical downlink control channel (PDCCH) received by the UE that indicates more than one transmission configuration indication (TCI) state, and the multi-TRP mode is a single PDCCH and single physical downlink shared channel (PDSCH) mode, the DCI includes a TCI field to indicate the more than one TCI state, and the DCI indicates a set of quasi-co-location (QCL) relationships for different PDSCH layers corresponding to multiple TRPs associated with the multi-TRP mode.

In a sixth aspect, alone or in combination with one or more of the first through fifth aspects, the UE is configured to operate in the multi-TRP mode based at least in part on receiving two downlink control information (DCI) transmissions in two control resource sets (CORESETs) or in two search space sets in a same CORESET, and each CORESET of the two CORESETS or each search space set of the two search space sets is associated with a respective TRP, and the multi-TRP mode is a multiple physical downlink control channels (PDCCHs) and multiple physical downlink shared channels (PDSCHs) TRP mode.

In a seventh aspect, alone or in combination with one or more of the first through sixth aspects, the UE is configured to operate in the multi-TRP mode based at least in part on receiving two downlink control information (DCI) transmissions in a same search space set from a same TRP, and the DCI identifies a set of physical downlink control channel candidates that is reserved for each TRP, of multiple TRPs, associated with the multi-TRP mode, and the DCI includes a transmission configuration indication (TCI) field that indicates a TCI state of a TRP, of the multiple TRPs, associated with the TCI field, and the multi-TRP mode is a multiple physical downlink control channels (PDCCHs) and multiple physical downlink shared channels (PDSCHs) TRP mode.

In an eighth aspect, alone or in combination with one or more of the first through seventh aspects, configuring the UE to operate in the multi-TRP mode is based at least in part on one of: configuring an entire set of physical downlink shared channel (PDSCH) configurations for each TRP, of multiple TRPs, associated with the multi-TRP mode; or configuring the UE to operate in the multi-TRP mode based at least in part on configuring a subset of a set of physical downlink shared channel (PDSCH) configurations for each TRP, of multiple TRPs, associated with the multi-TRP mode, and a respective configuration of the subset of the set of PDSCH configurations is not constant across the multiple TRPs.

In a ninth aspect, alone or in combination with one or more of the first through eighth aspects, the BWP switch is triggered by a radio resource control (RRC) configuration received by the UE, and the RRC configuration indicates a new active BWP but does not update a configuration regarding a switch of the TRP mode of the new active BWP, and the RRC configuration includes an update of another configuration that changes the TRP mode of the new active BWP.

In a tenth aspect, alone or in combination with one or more of the first through ninth aspects, the BWP switch is triggered when a set of BWPs used by the UE before and after switching the TRP mode within the BWP have different TRP modes.

In an eleventh aspect, alone or in combination with one or more of the first through tenth aspects, the trigger is at least one of a radio resource control (RRC)-based trigger within the BWP, a downlink control information (DCI)-based trigger within the BWP, or a medium access control control element (MAC CE)-based trigger within the BWP.

In a twelfth aspect, alone or in combination with one or more of the first through eleventh aspects, a physical downlink shared channel (PDSCH) configuration of a PDSCH corresponds to a specific index of an array of PDSCH configurations associated with multiple TRPs, and the TRP mode is the multi-TRP mode.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:

determining to configure a user equipment (UE) to operate in a transmission/reception point (TRP) mode, wherein the TRP mode is a single-TRP mode or a multi-TRP mode; and configuring the UE to operate in the TRP mode based at least in part on a bandwidth part (BWP) switch or a trigger to switch between the multi-TRP mode and the single-TRP mode within a BWP, wherein configuring the UE to operate in the TRP mode comprises configuring the UE to operate in the multi-TRP mode using a field in radio resource control (RRC) signaling, wherein a value of the field in a cell-level configuration is associated with configuring the UE to operate in the multi-TRP mode for a set of bandwidth parts (BWPs) associated with the UE, and wherein the value of the field in a BWP-level configuration is associated with configuring the UE to operate in the multi-TRP mode for each BWP of the set of BWPs.

2. The method of claim 1, wherein the UE is configured to operate in the TRP mode on a per bandwidth part (BWP) basis.

3. The method of claim 1, wherein the UE is configured to operate in the TRP mode further based at least in part on at least one of:
a physical downlink shared channel (PDSCH) configuration,
a physical downlink control channel (PDCCH) configuration,
a PDCCH format, or
a combination thereof.

4. The method of claim 1, wherein the BWP switch is triggered by a radio resource control (RRC) configuration transmitted to the UE,
wherein the RRC configuration indicates a new active BWP but does not update a configuration regarding a switch of the TRP mode of the new active BWP,
wherein the RRC configuration includes an update of another configuration that changes the TRP mode of the new active BWP.

5. The method of claim 1, wherein the trigger is a radio resource control (RRC)-based trigger within the BWP, a downlink control information (DCI)-based trigger, or a medium access control control element (MAC CE)-based trigger within the BWP.

6. The method of claim 5, wherein:
the BWP has multiple TRP mode configurations that are each associated with one TRP mode, or a structure of a radio resource control (RRC) configuration received by the UE is based at least in part on the multi-TRP mode.

7. The method of claim 1, wherein a physical downlink shared channel (PDSCH) configuration of a PDSCH corresponds to a specific index of an array of PDSCH configurations associated with multiple TRPs,
wherein the TRP mode is the multi-TRP mode.

8. A method of wireless communication performed by a user equipment (UE), comprising:
receiving configuration information associated with causing the UE to operate in a transmission/reception point (TRP) mode, wherein the TRP mode is a single-TRP mode or a multi-TRP mode; and
configuring the UE to operate in the TRP mode based at least in part on receiving the configuration information and at least one of a bandwidth part (BWP) switch or a trigger to switch between the multi-TRP mode and the single-TRP mode within a BWP,
wherein the UE is configured to operate in the multi-TRP mode based at least in part on a field in radio resource control (RRC) signaling from a base station (BS),
wherein a value of the field in a cell-level configuration is associated with configuring the UE to operate in the multi-TRP mode for a set of bandwidth parts (BWPs) associated with the UE, and
wherein the value of the field in a BWP-level configuration is associated with configuring the UE to operate in the multi-TRP mode for each BWP of the set of BWPs.

9. The method of claim 8, wherein the UE is configured to operate in the multi-TRP mode on a per bandwidth part (BWP) basis.

10. The method of claim 8, wherein the UE is configured to operate in the TRP mode based at least in part on at least one of:
a physical downlink shared channel (PDSCH) configuration included in the configuration information,
a physical downlink control channel (PDCCH) configuration included in the configuration information,
a PDCCH format included in the configuration information, or
a combination thereof.

11. The method of claim 8, wherein the BWP switch is triggered by a radio resource control (RRC) configuration received by the UE,
wherein the RRC configuration indicates a new active BWP but does not update a configuration regarding a switch of the TRP mode of the new active BWP,
wherein the RRC configuration includes an update of another configuration that changes the TRP mode of the new active BWP.

12. The method of claim 8, wherein the BWP switch is triggered when a set of BWPs used by the UE before and after switching the TRP mode within the BWP have different TRP modes.

13. A method of wireless communication performed by a user equipment (UE), comprising:
receiving configuration information associated with causing the UE to operate in a transmission/reception point (TRP) mode, wherein the TRP mode is a single-TRP mode or a multi-TRP mode; and
configuring the UE to operate in the TRP mode based at least in part on receiving the configuration information and at least one of a bandwidth part (BWP) switch or a trigger to switch between the multi-TRP mode and the single-TRP mode within a BWP,
wherein the UE is configured to operate in the multi-TRP mode based at least in part on downlink control information (DCI) of a physical downlink control channel (PDCCH) received by the UE that indicates more than one transmission configuration indication (TCI) state, wherein the multi-TRP mode is a single PDCCH and single physical downlink shared channel (PDSCH) mode, the DCI includes a TCI field to indicate the more than one TCI state, and the DCI indicates a set of quasi-co-location (QCL) relationships for different PDSCH layers corresponding to multiple TRPs associated with the multi-TRP mode.

14. The method of claim 13, wherein a physical downlink shared channel (PDSCH) configuration of a PDSCH corresponds to a specific index of an array of PDSCH configurations associated with multiple TRPs,
wherein the TRP mode is the multi-TRP mode.

15. A method of wireless communication performed by a user equipment (UE), comprising:
receiving configuration information associated with causing the UE to operate in a transmission/reception point (TRP) mode, wherein the TRP mode is a single-TRP mode or a multi-TRP mode; and
configuring the UE to operate in the TRP mode based at least in part on receiving the configuration information and at least one of a bandwidth part (BWP) switch or a trigger to switch between the multi-TRP mode and the single-TRP mode within a BWP, wherein the UE is configured to operate in the multi-TRP mode based at least in part on receiving two downlink control information (DCI) transmissions in two control resource sets (CORESETs) or in two search space sets in a same CORESET, wherein each CORESET of the two CORESETS or each search space set of the two search space sets is associated with a respective TRP, wherein the multi-TRP mode is a multiple physical downlink control channels (PDCCHs) and multiple physical downlink shared channels (PDSCHs) TRP mode.

16. A method of wireless communication performed by a user equipment (UE), comprising:

receiving configuration information associated with causing the UE to operate in a transmission/reception point (TRP) mode, wherein the TRP mode is a single-TRP mode or a multi-TRP mode; and configuring the UE to operate in the TRP mode based at least in part on receiving the configuration information and at least one of a bandwidth part (BWP) switch or a trigger to switch between the multi-TRP mode and the single-TRP mode within a BWP, wherein the UE is configured to operate in the multi-TRP mode based at least in part on receiving two downlink control information (DCI) transmissions in a same search space set from a same TRP, wherein the DCI identifies a set of physical downlink control channel candidates that is reserved for each TRP, of multiple TRPs, associated with the multi-TRP mode, wherein the DCI includes a transmission configuration indication (TCI) field that indicates a TCI state of a TRP, of the multiple TRPs, associated with the TCI field, wherein the multi-TRP mode is a multiple physical downlink control channels (PDCCHs) and multiple physical downlink shared channels (PDSCHs) TRP mode.

17. The method of claim 16, wherein the trigger is at least one of a radio resource control (RRC)-based trigger within the BWP, a downlink control information (DCI)-based trigger within the BWP, or a medium access control control element (MAC CE)-based trigger within the BWP.

* * * * *